United States Patent [19]
Sato

[11] Patent Number: 6,094,544
[45] Date of Patent: *Jul. 25, 2000

[54] PHOTOGRAPHING OPERATION CONTROL DEVICE

[75] Inventor: Koichi Sato, Tokyo, Japan

[73] Assignee: Asahi Kogaku Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/604,398

[22] Filed: Feb. 21, 1996

[30] Foreign Application Priority Data

Feb. 21, 1995 [JP] Japan ................................. 7-056582
Feb. 21, 1995 [JP] Japan ................................. 7-056583
Feb. 21, 1995 [JP] Japan ................................. 7-056584

[51] Int. Cl.[7] .......................... G03B 17/48; G03B 29/00; G03B 15/03
[52] U.S. Cl. .......................... 396/429; 396/165; 396/180; 396/187
[58] Field of Search .............................. 396/30, 429, 430, 396/227, 235–239, 242, 245, 165, 166, 169, 180, 187

[56] References Cited

U.S. PATENT DOCUMENTS

| 3,731,601 | 5/1973 | Matsuzaki et al. ......................... 95/10 |
| 3,896,472 | 7/1975 | Yoshiyama et al. ...................... 354/29 |
| 3,987,468 | 10/1976 | Matsuzaki et al. ..................... 354/145 |
| 4,052,726 | 10/1977 | Hopfner et al. ........................... 354/29 |
| 4,086,582 | 4/1978 | Kiyohara et al. .......................... 354/33 |
| 4,182,556 | 1/1980 | Tano et al. ................................ 354/60 |
| 4,187,019 | 2/1980 | Uchiyama et al. ........................ 354/33 |
| 4,431,287 | 2/1984 | Sakai et al. .............................. 354/441 |
| 5,280,319 | 1/1994 | Sato et al. ................................ 354/442 |
| 5,298,947 | 3/1994 | Aono et al. .............................. 355/211 |
| 5,315,410 | 5/1994 | Takanshi et al. . |
| 5,333,031 | 7/1994 | Mukai ...................................... 354/442 |
| 5,384,617 | 1/1995 | Kobayashi et al. ...................... 354/419 |
| 5,408,341 | 4/1995 | Takanashi et al. ...................... 358/471 |
| 5,424,156 | 1/1995 | Aoki et al. . |
| 5,631,700 | 5/1997 | Sato . |
| 5,708,472 | 1/1998 | Morisawa et al. . |
| 5,708,864 | 1/1998 | Katayama et al. ........................ 396/53 |
| 5,739,849 | 4/1998 | Aoki et al. . |
| 5,805,945 | 9/1998 | Aoki . |
| 5,808,675 | 9/1998 | Yamamoto . |
| 5,842,050 | 11/1998 | Aoki . |
| 5,857,125 | 1/1999 | Morisawa . |

FOREIGN PATENT DOCUMENTS

| 327236 | 1/1989 | European Pat. Off. . |
| 2-29081 | 1/1990 | Japan . |
| 3-15087 | 1/1991 | Japan . |
| 3278342 | 12/1991 | Japan . |
| 5-2280 | 1/1993 | Japan . |
| 5-24706 | 4/1993 | Japan . |
| 5150251 | 6/1993 | Japan . |
| 6313894 | 11/1994 | Japan . |

Primary Examiner—David M. Gray
Assistant Examiner—Christopher Mahoney
Attorney, Agent, or Firm—Greenblum & Bernstein, P.L.C.

[57] ABSTRACT

A photographing operation control device has an electro-developing recording medium to electronically develop an image formed thereon. An exposure calculation is performed based on a photometry value corresponding to an object to be photographed, so that the exposure period of the electro-developing recording medium is determined. When the exposure period is longer than an output period for which a recording medium activating signal for enabling the electro-developing recording medium to develop the image is outputted, it is determined that the exposure of the electro-developing recording medium is impossible, and the photographing operation is prevented and a warning indicating that the photographing operation is impossible is performed.

15 Claims, 23 Drawing Sheets

PHOTOGRAPHING OPERATION CONTROL DEVICE

BACKGROUND OF THE INVENTION

1. Field of the Invention

The present invention relates to a camera using a recording medium which electronically develops an image obtained by exposing a recording medium, and more particularly, to a device controlling a photographing operation of the camera.

2. Description of the Related Art

Conventionally, there is known a photographic material which electronically develops an optical image formed thereon through a photographing lens. Japanese Unexamined Patent Publication No. 5-2280, for example, discloses a recording material which is a combination of an electrostatic information recording material and an electric charge keeping medium. In this specification, such a recording medium is referred to as an electro-developing recording material, and a camera using the electro-developing recording material is referred to as an electro-developing type camera.

In the electro-developing recording medium disclosed in the above publication, the electrostatic information recording material has a photo conducting layer and an inorganic oxide material layer, and the electric charge keeping medium has a liquid crystal display. In this structure, when the electrostatic information recording material is exposed while an electric voltage is applied to the electrostatic information recording material and the electric charge keeping medium, an electric charge in accordance with the amount of incident light is generated in the electrostatic information recording material. Since the intensity of an electric field applied to the liquid crystal display facing the electrostatic information recording material varies in accordance with the generated electric charge, an image corresponding to the amount of light distribution is indicated or developed on the liquid crystal display.

Japanese Unexamined Patent Publication No. 5-150251 discloses a dispersion type liquid crystal display in which an image indicated on the liquid crystal display is kept even if the electric field applied to the liquid crystal display is removed.

A contrast of the image indicated on the liquid crystal display becomes larger since an electric voltage is started to be applied to the electro-developing recording medium, and when the image is bright, the contrast becomes a maximum when the electric voltage has been applied to the electro-developing recording medium for a predetermined period. Therefore, by stopping the voltage application at that time, an image having a high contrast can be obtained. Conversely, although when the image is dark, the contrast becomes the maximum when the electric voltage has been applied to the electro-developing recording medium for a period longer than the predetermined period, the contrast does not become so high if the voltage applying time is long to some extent. Therefore, the voltage applying time onto the electro-developing recording medium is set so that a contrast having a predetermined degree is obtained.

Nevertheless, when the exposure period for which the electro-developing recording medium is exposed is longer than the voltage applying time, as a result of an exposure calculation based on a photometry value, a problem occurs in which a clear image cannot be recorded on the electro-developing recording medium since the voltage applying is stopped during the exposure. On the other hand, as disclosed in Japanese Unexamined Patent Publication No. 3-278342, by setting an electric voltage, which is applied to the electro-developing recording medium, to a low value, the voltage applying time can be prolonged, but a problem occurs in which the liquid crystal display cannot indicate a clear image if the applied voltage is too low.

On the other hand, if an electronic flash is used for an electro-developing type camera, the radiation of the electronic flash may be performed after the shutter is fully open. However, in a construction in which the electric voltage is applied to the electro-developing recording medium in synchronization with a start of the opening operation of the shutter, a predetermined time needs to pass from the voltage application to the flash radiation. Therefore, the voltage application during the predetermined time cannot be used for the development. Conversely, if the voltage application to the electro-developing recording medium is started prior to the exposure, the contrast of the image formed on the liquid crystal display becomes low since the required voltage difference between a bright portion and a dark portion in the image is difficult to obtain, as described later.

SUMMARY OF THE INVENTION

Therefore, an object of the present invention is to provide a photographing operation control device by which an unwanted image is prevented from being recorded in the electro-developing recording medium.

According to the present invention, there is provided a photographing operation control device provided in an electro-developing type camera, the control device comprising an electro-developing recording medium, outputting means, performing means and determining means.

The electro-developing recording medium electronically develops an image which is formed by exposing the electro-developing recording medium. The outputting means outputs a recording medium activating signal so that the electro-developing recording medium can develop the image. The performing means performs an exposure calculation based on a photometry value, so that an exposure period, for which the electro-developing recording medium is exposed to develop the image, is determined. The determining means determines whether or not the exposure of the electro-developing medium can be carried out, based on the length of the exposure period.

Another object of the present invention is to provide a photographing operation control device by which an unwanted image is prevented from being recorded in the electro-developing recording medium, and a desired image can be obtained by radiating an electronic flash.

According to the present invention, there is provided a photographing operation control device provided in an electro-developing type camera, the control device comprising an electronic flash, an electro-developing recording medium, outputting means, performing means, and radiating means.

The electro-developing recording medium electronically develops an image which is formed by exposing the electro-developing recording medium. The outputting means outputs a recording medium activating signal so that the electro-developing recording medium can develop the image. The performing means performs an exposure calculation based on a photometry value, so that a first set exposure period, for which the electro-developing recording medium could be exposed to develop the image, is obtained. The radiating means radiates the electronic flash, when the first set exposure period is longer than a standard value, so that an actual exposure period, for which the electro-developing recording medium is actually exposed, becomes shorter than the first set exposure period.

Another object of the present invention is to provide a photographing operation control device by which, in a photographing operation with radiating the electronic flash, a useless voltage application is prevented, and an image having a high contrast can be obtained.

According to the present invention, there is provided a photographing operation control device provided in an electro-developing type camera, the control device comprising an electro-developing recording medium, outputting means, an electronic flash, determining means, and control means.

The electro-developing recording medium electronically develops an image which is formed by exposing the electro-developing recording medium. The outputting means outputs a recording medium activating signal so that the electro-developing recording medium can develop the image. The determining means determines whether or not the electronic flash should be radiated. The control means controls the electronic flash to radiate at a predetermined timing, when the determining means determines that the electronic flash should be radiated. The electronic flash is radiated substantially at the same time when the recording medium activating signal is outputted.

BRIEF DESCRIPTION OF THE DRAWINGS

The objects and advantages of the present invention will be better understood from the following description, with reference to the accompanying drawings, in which.

DESCRIPTION OF THE PREFERRED EMBODIMENTS

Figure 1:
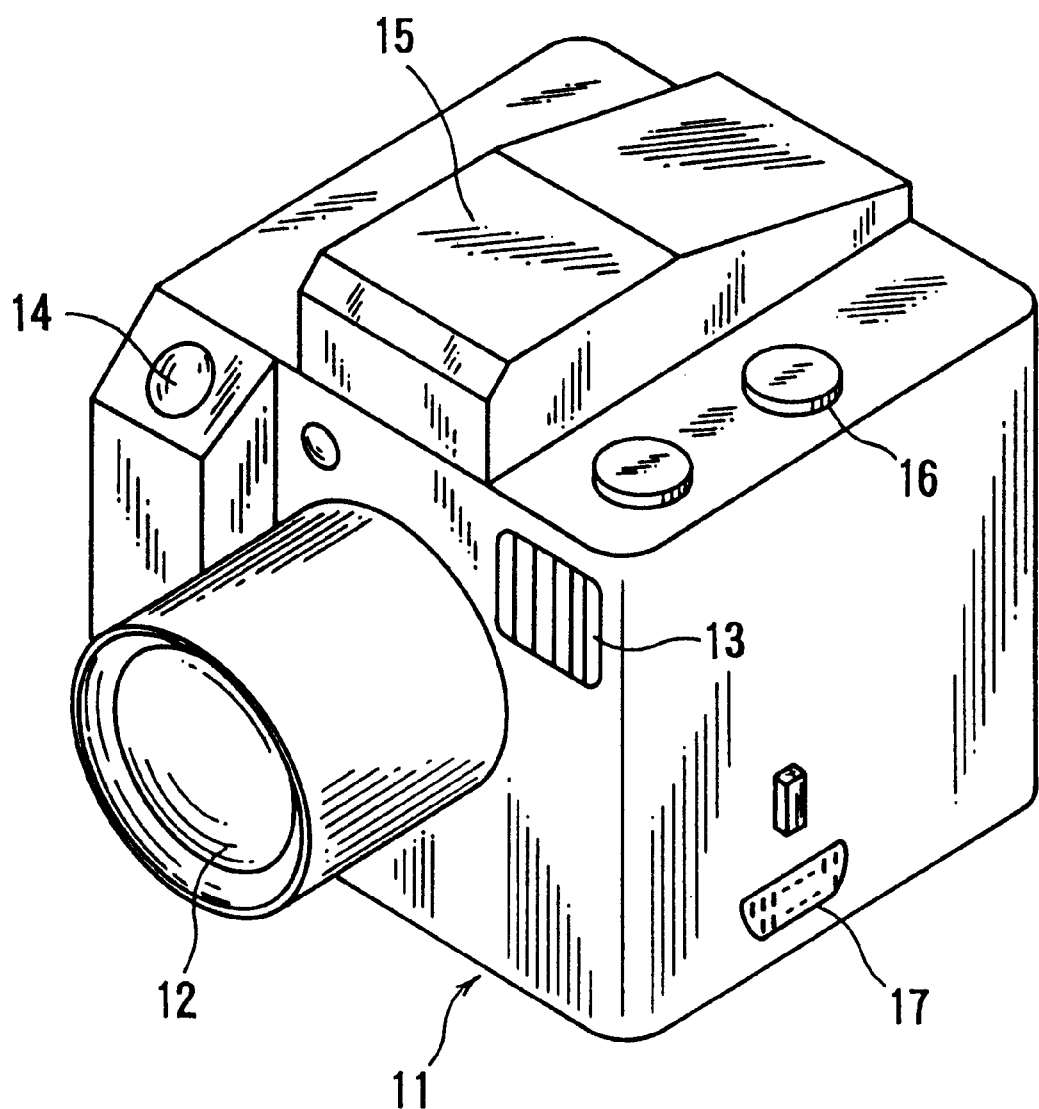
FIG. 1 is an external view showing a still video camera to which a photographing operation control device of a first embodiment according to the present invention is applied.

FIG. 1 is an external view of a still video camera to which a photographing operation control device of a first embodiment according to the present invention is applied. This still video camera is an electro-developing type camera which is constructed in such a manner that an image of an object to be photographed is developed by an electro-developing recording medium.

When viewing a camera body 11 from a front side, on the front surface of the camera body 11, a photographing optical system 12 including a photographing lens system and so on is provided on approximately a central portion of the front surface, and an electronic flash 13 is disposed on a portion to the right of and above the photographing optical system 12. A release switch 14 is provided on the side opposite to the electronic flash 13. On the upper surface of the camera body 11, a view finder 15 is provided at the center portion thereof, and operation switches including a scan start switch 16 are provided on a side of the view finder 15. On a side surface of the camera body 11, an output terminal 17 is formed on a lower portion thereof so that an image signal obtained by this camera can be outputted to an external recording device.

Figure 2:
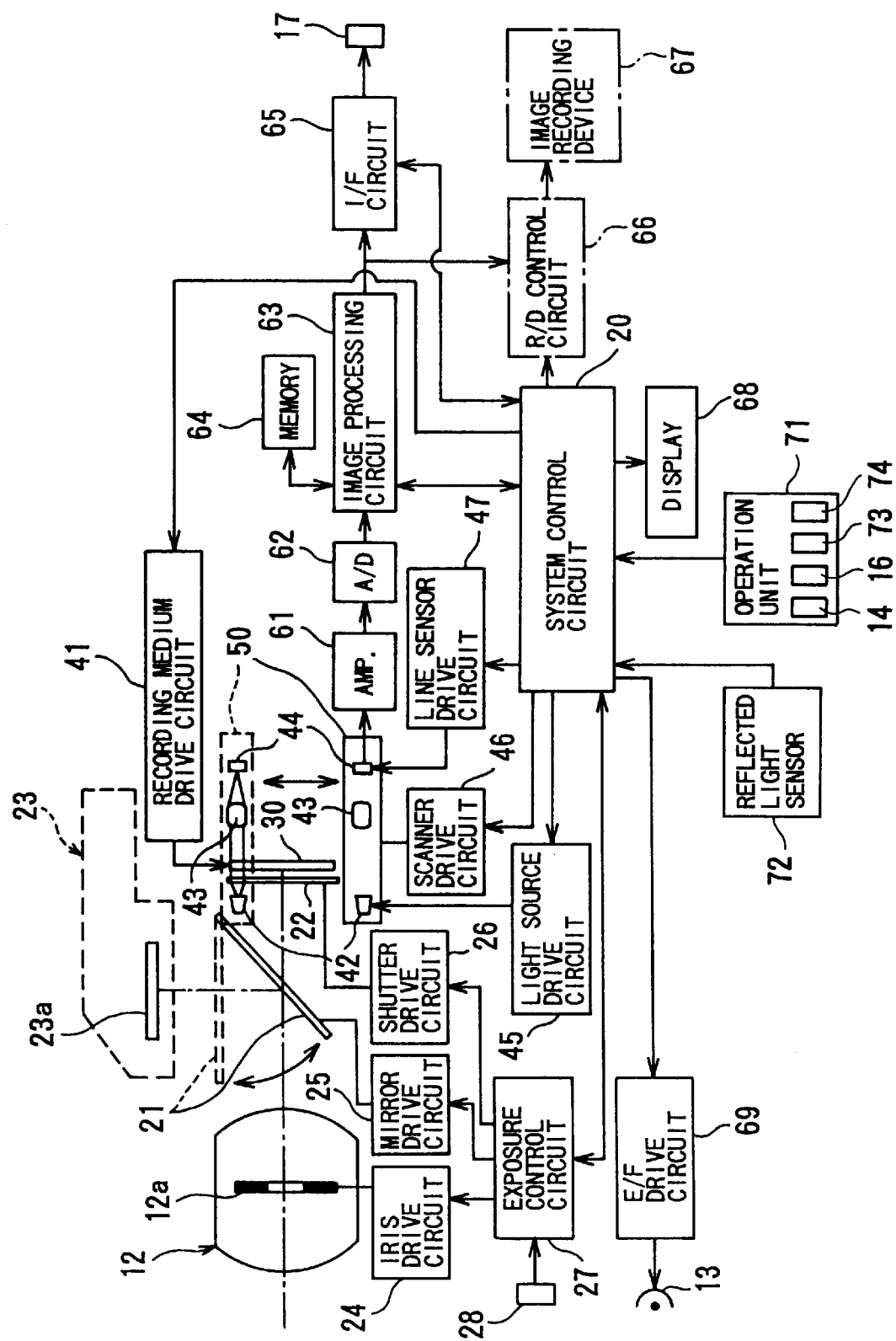
FIG. 2 is a block diagram of the still video camera.

FIG. 2 is a block diagram of the still video camera, in which a system control circuit 20 including a microcomputer is mounted to control the still video camera as a whole.

The photographing optical system 12 has a plurality of lens groups and an aperture 12a. An electro-developing recording medium 30 is disposed behind the photographing optical system 12, and a quick return mirror 21 is placed between the photographing optical system 12 and the electro-developing recording medium 30. A shutter 22 is provided between a quick return mirror 21 and the electro-developing recording medium 30. A focusing glass 23a included in a view finder optical system 23 is disposed above the quick return mirror 21.

The aperture 12a, the quick return mirror 21 and the shutter 22 are driven by an iris drive circuit 24, a mirror drive circuit 25 and a shutter drive circuit 26, respectively, which are controlled by an exposure control circuit 27.

The exposure control circuit 27 is operated in accordance with a command signal outputted by the system control circuit 20. Namely, when an exposure is controlled, the opening degree of the aperture 12a is adjusted by the iris drive circuit 24 under control of t he exposure control circuit 27 based on an output signal of a photometry sensor 28.

The quick return mirror 21 is usually set to a down position (an inclining position shown by the solid line in the drawing), so that a light beam passing through the photographing optical system 12 is led to the view-finder optical system 23 so that an object to be photographed can be observed by the photographer. When a photographing operation is carried out, the quick return mirror 21 is rotated upward by the mirror drive circuit 25 and set to an up position (a horizontal position shown by the broken line in the drawing), so that the light beam is led to the electro-developing recording medium 30.

The shutter 22 is usually closed, and upon a photographing operation, the shutter 22 is opened for a predetermined period by the shutter drive circuit 26 under control of the exposure control circuit 27, and thus, the light beam passing through the photographing optical system 12 enters a light receiving surface of the electro-developing recording medium 30, thus forming a two-dimensional image thereon. Note that, also when a scanning operation of a scanning mechanism 50 is performed, the shutter 22 is opened.

An electric voltage is applied to the electro-developing recording medium 30 under control off a recording medium drive circuit 41. By exposing the electro-developing recording medium 30 while applying the voltage, an image formed by the photographing optical system 12 is developed on the electro-developing recording medium 30 as a visible image. Note that the recording medium drive circuit 41 is operated in accordance with a command signal outputted by the system control circuit 20.

The scanning mechanism 50 is provide d close to the electro-developing recording medium 30. A light source 42 includes an LED (light emitting diode) and a collimator lens, and emits a parallel light beam. The light source 42, a scanner optical system 43 and a line sensor 44 are supported by the scanning mechanism 50, and are moved along the electro-developing recording material 30 by a scanning operation of, for example, the scanning mechanism 50.

The line sensor 44 may be a one-dimensional CCD sensor of, for example, 2000 pixels, The line sensor 44 may be of suitable length to completely cover and extend over one horizontal scanning line of the image formed on the electro-developing recording medium 30. The line sensor 44 serves as a photoelectric-conversion device, which converts an optical image to an electric signal. The light source 42 can be moved along the front surface of the shutter 22 or the front surface of the electro-developing recording medium 30, and the line sensor 44 can be moved along the rear surface of the electro-developing recording medium 30. The scanner optical system 43 is disposed between the light source 42 and the line sensor 44. When scanning is carried out by the scanning mechanism 50, the scanner optical system 43 is positioned between the electro-developing recording medium 30 and the line sensor 44, so that the image developed by the electro-developing recording medium 30 is illuminated by the light source 42 and formed on the light receiving surface of the line sensor 44 due to an operation of the scanner optical system 43. Namely, the scanner optical system 43 is disposed on the optical path of the light be am which passes through the electro-developing recording medium 30, and the line sensor 44 is moved in an imaging plane, on which an image is formed, by the scanning optical system 43.

ON and OFF control of the light source 42 is performed by a light source drive circuit 45. Control of the reading operation of the pixel signal generated in the line sensor 44 is carried out by a line sensor drive circuit 47. Control of the movement of the scanning mechanism 50 is performed by a scanner drive circuit 46. The circuits 45, 46 and 47 are controlled by the system control circuit 20.

Pixel signals read out from the line sensor 44 are amplified by an amplifier 61, and converted to a digital signal by an A/D converter 62. The digital pixel signals are subjected to a shading correction, a gamma correction and so on by an image processing circuit 63 under control of the system control circuit 20, and then, is temporarily stored in a memory 64. The memory includes an EEPROM in which correction data for the shading correction is stored. Note that the memory 64 may have a storage capacity equal to one horizontal scanning line outputted from the line sensor 44, or may have a storage capacity of one frame worth of image signals.

The pixel signals outputted from the memory 64 are inputted into an interface circuit 65 through the image processing circuit 63, so that the pixel signals are subjected to a predetermined process such as a format conversion, and can be outputted to an external display device (not shown) through the output terminal 17. The pixel signals outputted from the image process circuit 63 are subjected to a predetermined process, such as an image compression and a format conversion, in a recording device control circuit 66, so that the pixel signals can be recorded on a recording medium such as an IC memory card, for example, in an image recording device 67. The interface circuit 65 and the recording device control circuit 66 are operated in accordance with a command signal outputted from the system control circuit 20.

An operation unit 71 having the release switch 14, the scan start switch 16, an auto-strobe selection switch 73 and a strobe switch 74 are connected to the system control circuit 20. A photographing operation is performed by operating the release switch 14. A reading operation of the pixel signals from the electro-developing recording medium 30 is performed by operating the scan start switch 16. The auto-strobe selection switch 73 is provided for selecting an auto-strobe mode in which a radiation of the electronic flash 13 is performed in accordance with a luminance of the object to be photographed. The strobe switch 74 is provided for radiating the electronic flash 13 compulsorily.

A display device 68 for indicating various setting conditions of the still video camera, an electronic flash drive circuit 69 for performing a flash control of the electronic flash 13, and a reflected light sensor 72 sensing the amount of light radiated by the electronic flash 13 and reflected by the object are also connected to the system control circuit 20.

Figure 3:
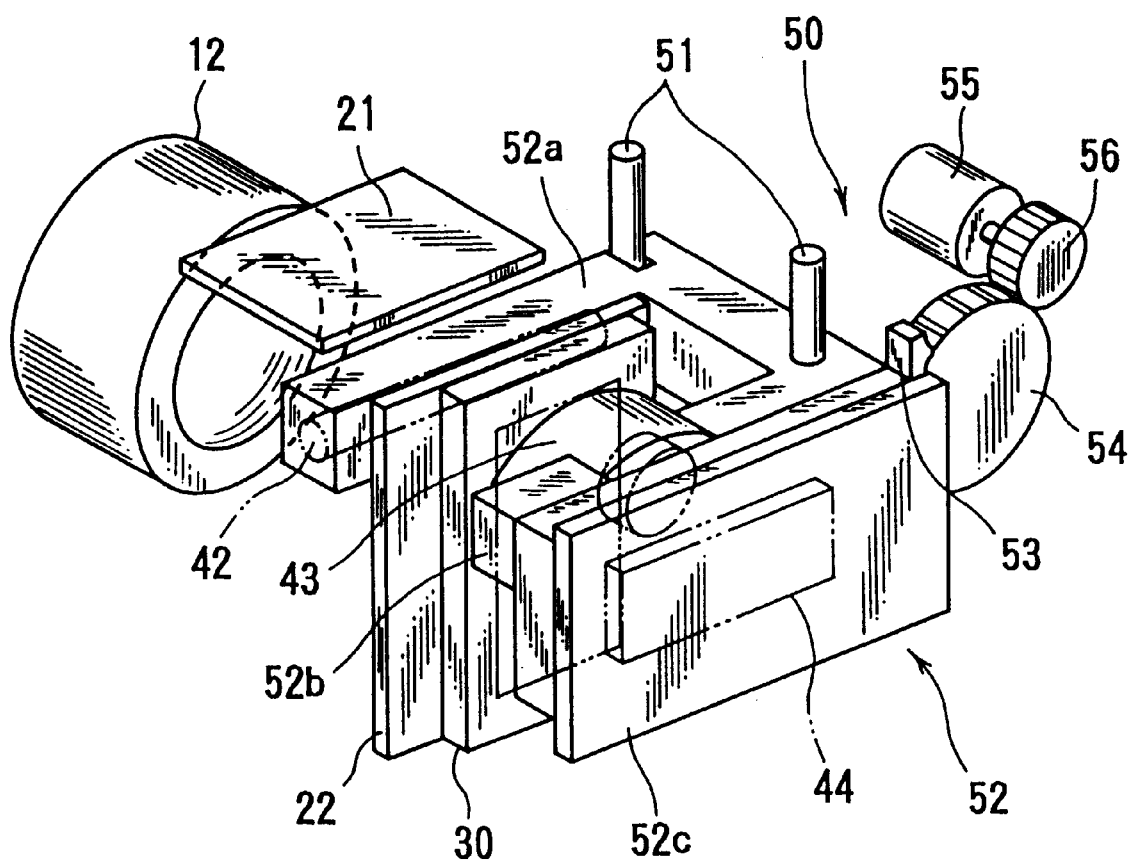
FIG. 3 is a perspective view showing a scanning mechanism and members provided around the mechanism.

FIG. 3 shows the structure of the scanning mechanism 50 and members provided around the mechanism 50.

The scanning mechanism 50 has a moving member 52 which is slidably supported by a pair of guide shafts 51 and has first and second leg portions 52a and 52b and a support portion 52c. The first leg portion 52a extends between the quick return mirror 21 and the shutter 22, and the second leg portion 52b extends behind the electro-developing recording medium 30. The support portion 52c is provided behind the second leg portion 52b. The light source 42, the scanner optical system 43 and the line sensor 44 are attached to the first leg portion 52a, the second leg portion 52b and the support portion 52c, respectively. The light source 42 and the line sensor 44 are extended in horizontal directions, respectively. A rack 53 fixed to the moving member 52 is meshed with a pinion 54 which is meshed with a gear 56 provided on an output shaft of a scan drive motor 55.

When reading out an image from the electro-developing recording medium 30 is not performed, the moving member 52 is positioned offset from a path between the photographing optical system 12 and the electro-developing recording medium 30, the position being, for example, below the electro-developing recording medium 30. When a photographing operation has been completed and an image has been developed in the electro-developing recording medium 30, the scan drive motor 55 is operated by operating the scan start switch 16. The moving member 52 is moved upward so that a scan of the line sensor 44 is carried out, and the line sensor 44 is moved in a direction perpendicular to the longitudinal direction of the line sensor 44.

Figure 4:
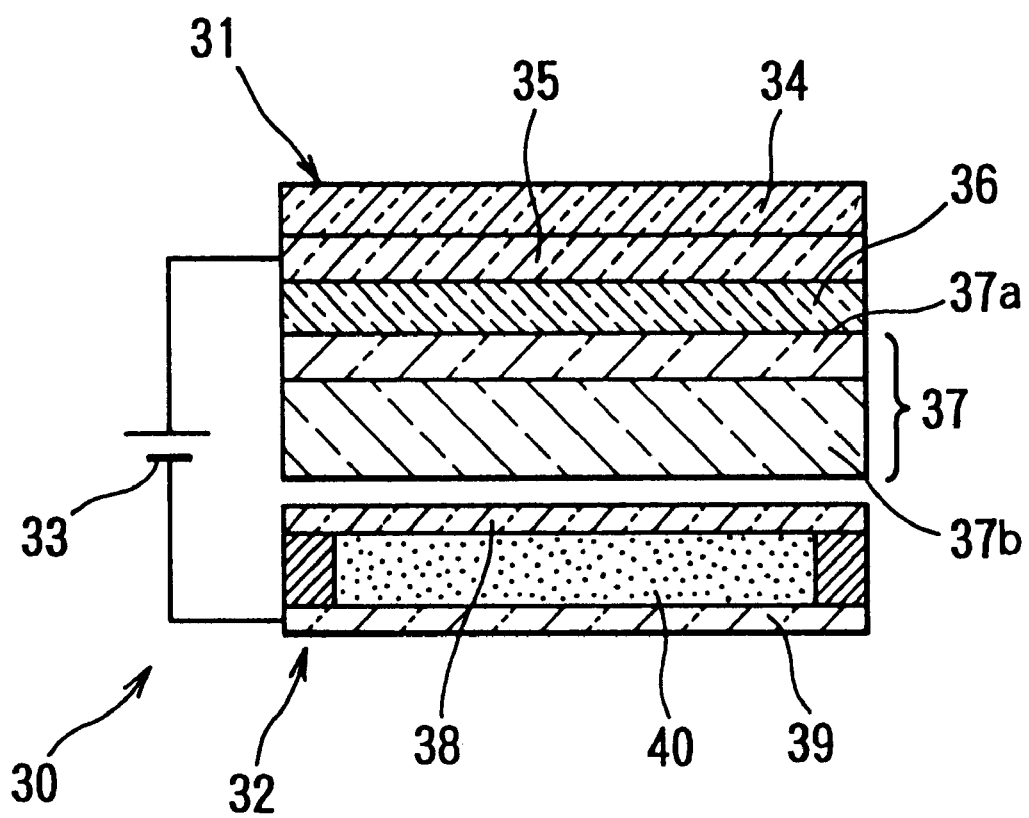
FIG. 4 is a view showing a structure of an electro-developing recording medium.

FIG. 4 shows a structure of the electro-developing recording medium 30, and is the same as that shown in Japanese Unexamined Patent Publication No. 5-2280.

The electro-developing recording medium 30 has an electrostatic information recording medium 31 and an electric charge keeping medium 32, and an electric voltage is applied thereto by a power source 33. The electric power source 33 corresponds to the recording medium drive circuit 41, so that an ON-OFF control of the electric power source 33 is an operation in which the recording medium drive circuit 41 applies a recording medium activating signal (a voltage signal) to the electro-developing recording medium 30.

The electrostatic information recording medium 31 is formed by laminating a base plate 34, an electrode layer 35, an inorganic oxide material layer 36 and a photoconducting layer 37. The photoconducting layer 37 is formed by laminating an electric charge generating layer 37a and an electric charge transferring layer 37b. The electric charge keeping medium 32 is formed by confining liquid crystal 40 between a liquid crystal supporting plate 38 and a liquid crystal electrode layer 39. The electric charge transferring layer 37b of the photoconducting layer 37 and the liquid crystal supporting plate 38 of the electric charge keeping medium 32 face each other with a small gap therebetween.

When the electric power source 33 is turned ON, an electric voltage is applied between the electrode layer 35 and the liquid crystal electrode layer 39, i.e., between the electrostatic information recording medium 31 and the electric charge keeping medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal display 40 is changed in accordance with the electric charge, the image is indicated on the liquid crystal display 40 as a visible image, and thus, an image of an object is developed. Namely, the visible image is generated in accordance with the electric charge.

The electric charge keeping medium 32 is a liquid crystal display having a memory-type liquid crystal. Thus, the developed visible image is kept therein even if the electric field is removed. In the liquid crystal display, the developed visible image can be deleted by heating the liquid crystal display, using a heating device (not shown) at a predetermined temperature. In such a case, the same electric charge keeping medium 32 can be used repeatedly.

Figure 5A:
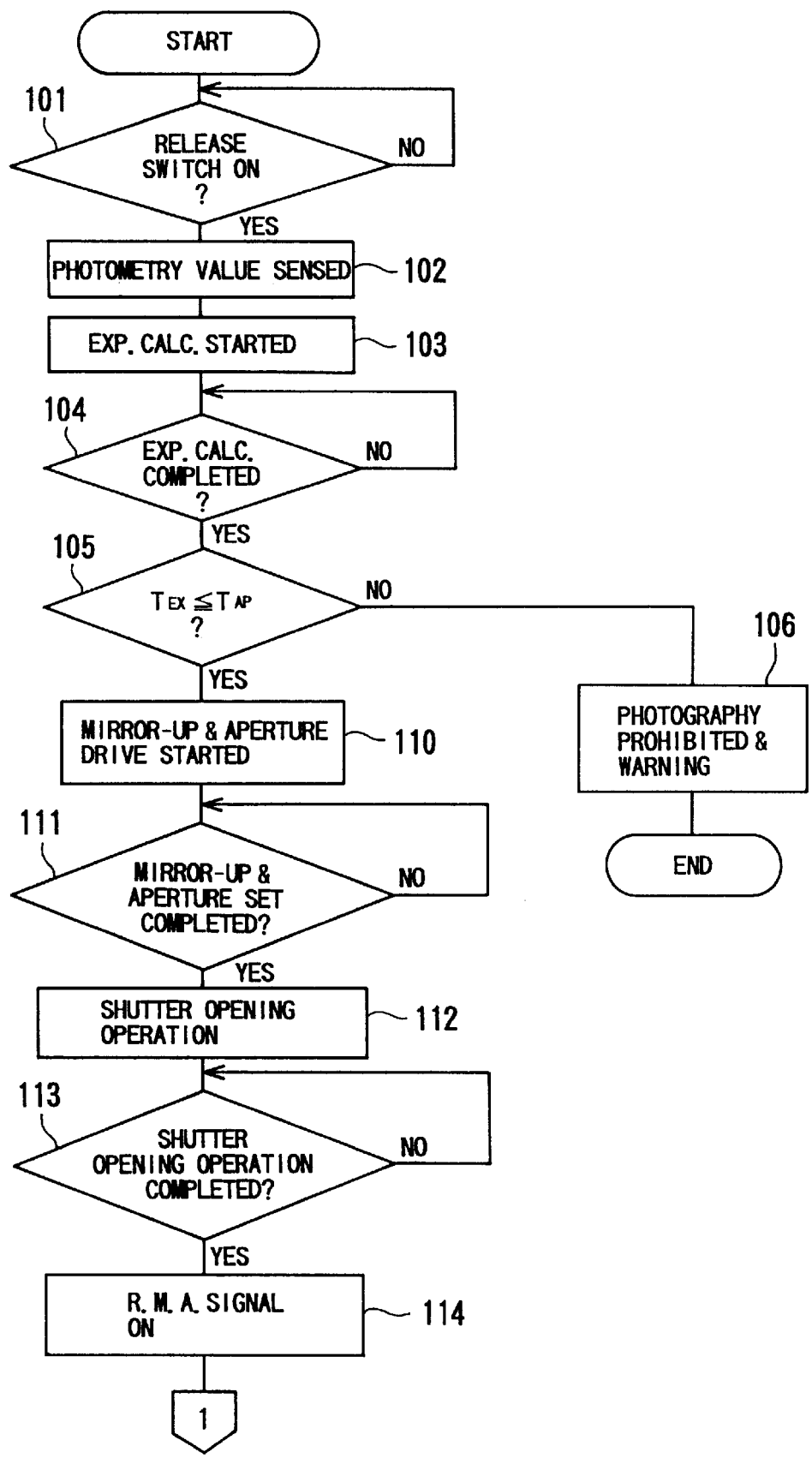
FIG. 5A is a first part of a flow chart of a photographing operation.
Figure 5B:
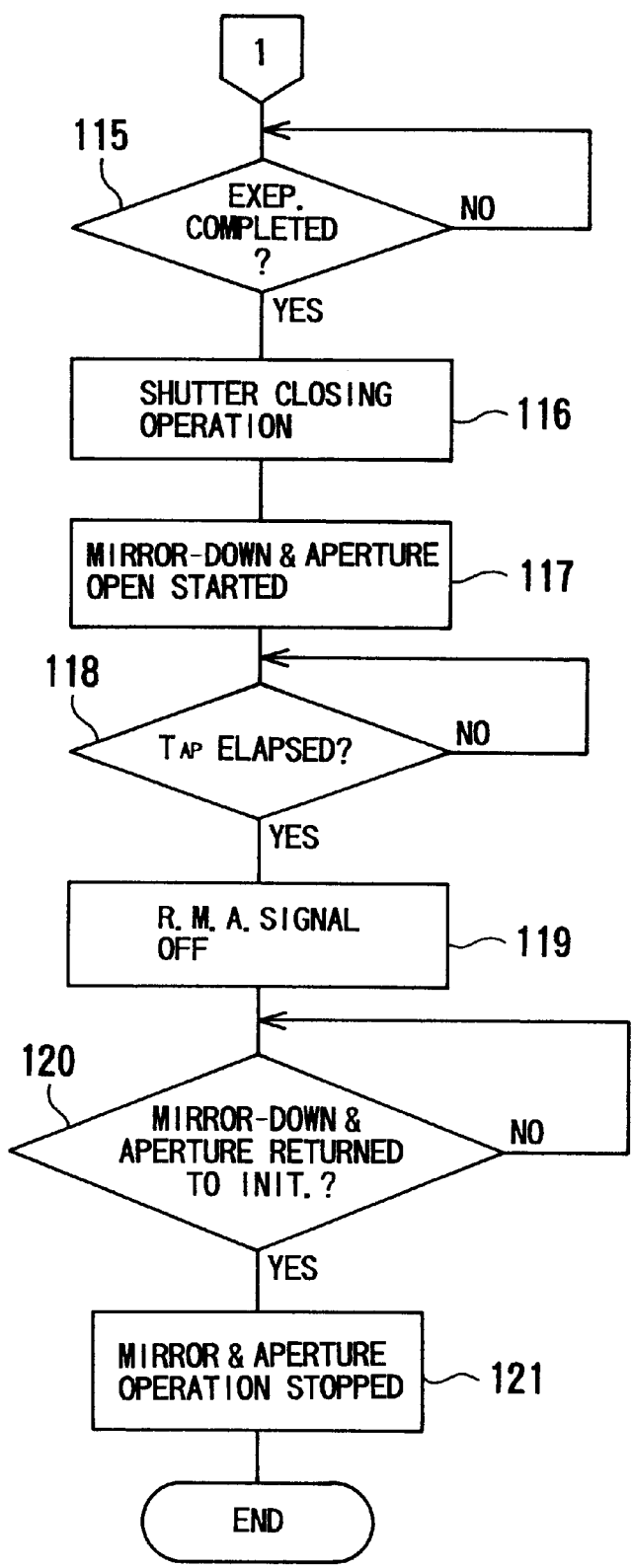
FIG. 5B is a second part of the flow chart shown in FIG. 5A.
Figure 6:
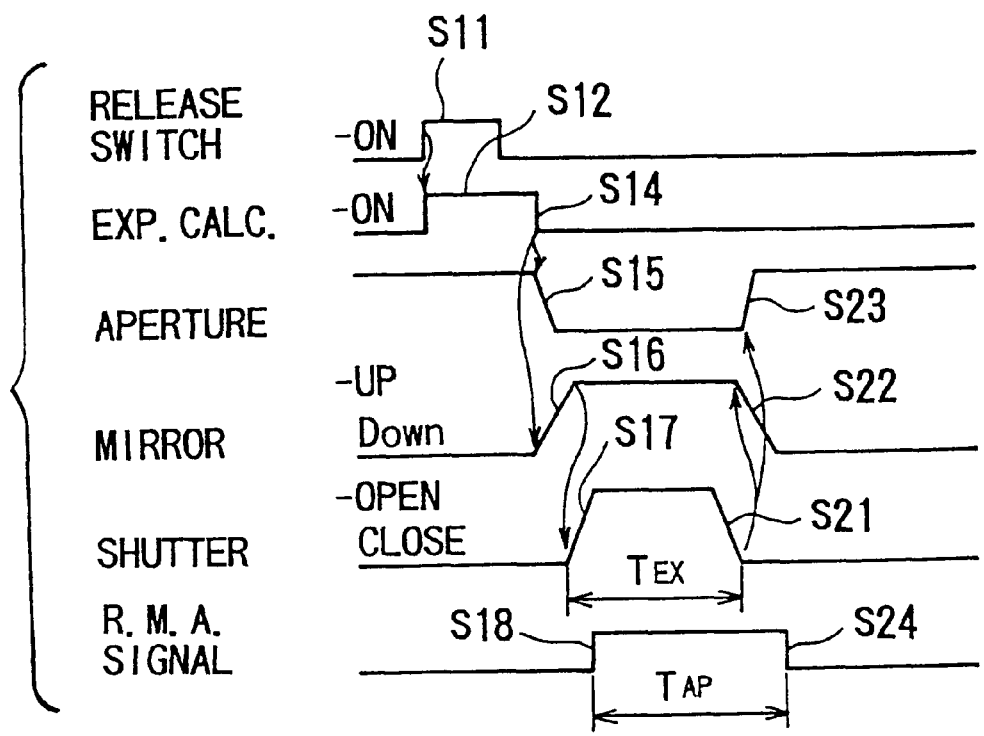
FIG. 6 is a timing chart showing the photographing operation.

FIGS. 5A and 5B show a flow chart of a photographing operation and FIG. 6 is a timing chart of the photographing operation. With reference to these drawings, an operation of the first embodiment will be described.

When it is sensed in Step 101 that the release switch 14 has been depressed (reference S11), an output signal of the photometry sensor 28, i.e., a photometry value, is sensed in Step 102. In Step 103, an exposure calculation is started based on the photometry value (reference S12). When it is confirmed in Step 104 that the exposure calculation has been completed to obtain an exposure period $T_{EX}$ (reference S14), it is determined in Step 105 whether the exposure period $T_{EX}$ obtained in Step 104 is longer than an output period (a voltage applying period $T_{AP}$) for which a recording medium activating signal (to be described later) is outputted. The recording medium activating signal is provided for applying an electric voltage to the electro-developing recording medium 30, and the voltage applying period $T_{AP}$ is set based on an experimental result, for example, so that an image developed by the electro-developing recording medium 30 has a proper contrast. Namely, in this embodiment, the voltage applying period $T_{AP}$ is a fixed value.

When it is determined in Step 105 that the exposure period $T_{EX}$ is longer than the voltage applying period $T_{AP}$, as will be described later with reference to FIGS. 7 and 8, it is determined that the exposure of the electro-developing recording medium 30 cannot be carried out, since an image having a proper contrast cannot be obtained. Then, Step 106 is executed, in which a process for prohibiting the photographing operation is performed, and a warning informing that the photographing is impossible is indicated on the display device 68, and then the program ends. Note that a prohibition flag is provided in a control program stored in the system control circuit 20, and the prohibiting process and the warning are performed by setting the prohibition flag to 1 in Step 106. The prohibition flag is reset to 0 when a predetermined time (10 seconds, for example) has passed after Step 106 is executed. Such an operation of the prohibition flag is also carried out in the embodiments described later.

Conversely, when it is determined in Step 105 that the exposure period $T_{EX}$ is shorter than or equal to the voltage applying period $T_{AP}$, Step 110 and the following Steps are executed so that a photographing operation is carried out. First, in Step 110, the opening degree of the aperture 12a is changed from the fully open state to a predetermined opening degree (reference S15), and the quick return mirror 21 is changed from the down condition to the up-condition (reference S16). When it is confirmed in Step 111 that the quick return mirror 21 has been changed to the up-condition and the opening degree adjustment of the aperture 12a has been completed, the shutter is started to open in Step 112 (reference S17). In this embodiment, the shutter 22 is a focal-plane shutter, and therefore, a magnet for performing a shutter charge is deenergized in Step 112.

In Step 113, it is determined whether the opening operation of the shutter 22 has been completed. This determination is carried out by measuring a time since the magnet is deenergized, i.e., the time after the opening operation of the shutter is started in Step 112. When the shutter 22 is fully opened, the recording medium activating signal is outputted in Step 114 (reference S18). Due to the output of the recording medium activating signal, a predetermined electric voltage is applied to the electro-developing recording medium 30. By exposing the electro-developing recording medium 30 under this condition, the object image is developed on the electro-developing recording medium 30 as a visible image, which is kept on the electro-developing recording medium 30 even after the output of the recording medium activating signal is stopped.

When, in Step 115, the exposure period $T_{EX}$ determined by the exposure calculation has passed and it is sensed that the exposure has been completed, the shutter 22 is closed in Step 116 (reference S21). By the completion of the closing operation of the shutter 22, Step 117 is executed so that the quick return mirror 21 is changed to the down-condition (reference S22) and the aperture 12a is driven to the fully open condition (reference S23). Af ter thes e operations of the mirror 21 and the aperture 12a are started, Step 118 is executed, in which it is determined whether the voltage applying period $T_{AP}$ has elapsed. When the voltage applying period $T_{AP}$ has passed, the output of the recording medium activating signal is stopped in Step 119 (reference S24). Then, when it is confirmed in Step 120 that the mirror 21 and the aperture 12a have returned to the initial conditions, respectively, the operations of the mirror 21 and the aperture 12a are stopped in Step 121, and thus, this photographing operation program ends.

Figure 7:
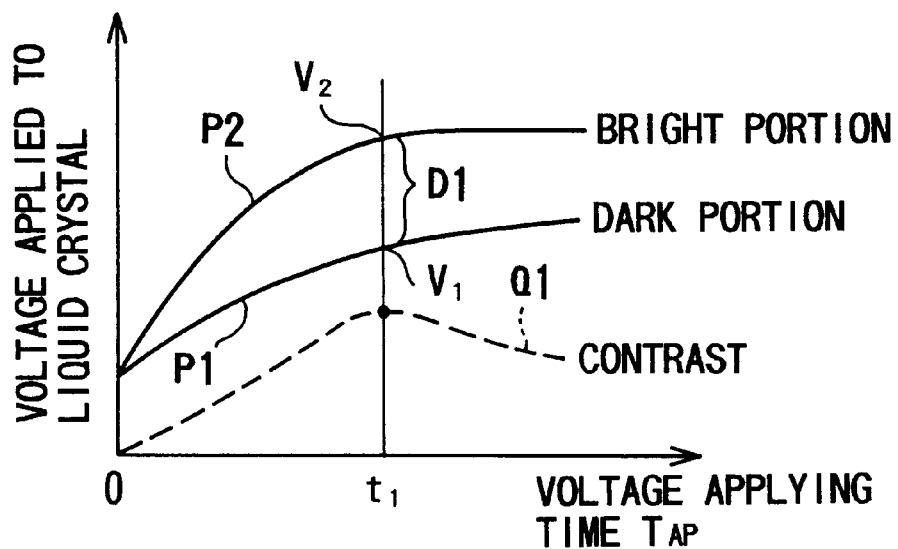
FIG. 7 is a view showing a relationship between a voltage applying period and a voltage generated in a liquid crystal of an electro-developing recording medium, when an object to be photographed is bright.
Figure 8:
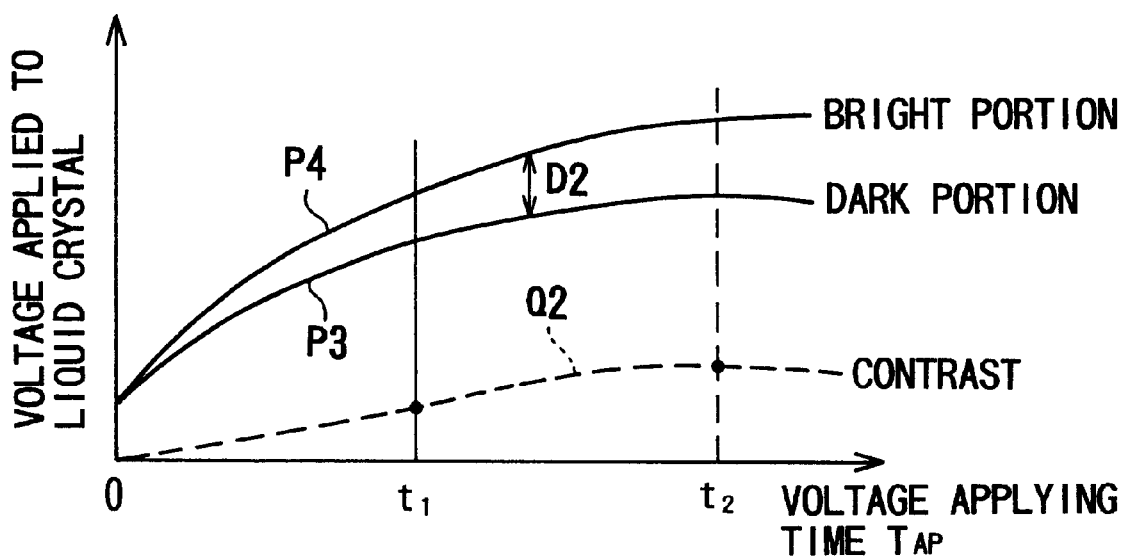
FIG. 8 is a view showing a relationship between the voltage applying period and a voltage generated in the liquid crystal, when the object is dark.

With reference to FIGS. 7 and 8, a relationship between the voltage applying time $T_{AP}$ and an electric voltage generated on the liquid crystal 40 of the electro-developing recording medium 30 is described. Note that, in these drawings, the voltage application to the electro-developing recording medium 30 is started at the same time when the exposure is started.

When the luminance of the image is relatively high, as shown by references P1 and P2 in FIG. 7, at the beginning, the voltage rises more quickly in a bright portion in the image than in a dark portion in the image, and at the time t1, the voltage difference D1 between the bright portion and the dark portion becomes maximum. After time t1, since the voltage of the bright portion does not rise so largely, the voltage difference between the bright portion and the dark portion decreases gradually. Namely, the contrast has the maximum value at time t1 as shown by the broken line Q1. Therefore, if the voltage application to the electro-developing recording medium 30 is stopped at time t1, an image having the optimum contrast is kept in the liquid crystal 40 of the electro-developing recording medium 30.

When the luminance of the image is relatively low, as shown in FIG. 8, although the voltage in a dark portion rises (see reference P3) similarly to that in the dark portion as shown by reference P4 in FIG. 7, the voltage in a bright portion rises (see reference P4) more slowly than that in the bright portion as shown by reference P1 in FIG. 7, and the rate of the rise does not change so largely with respect to the lapse of time. Therefore, the voltage difference D2 between the bright portion and the dark portion does not become a maximum at time t1, but increases with the lapse of time, and becomes a maximum at time t2, i.e., upon the elapse of a predetermined time since time t1. Namely, as shown by the broken line Q2, it takes a considerably long time before the contrast of the image comes to have the maximum value. If the voltage applying time $T_{AP}$ has elapsed before time t2, a sufficient contrast cannot be obtained.

Therefore, in this embodiment, as described above, when the exposure period $T_{EX}$ obtained by the exposure calculation is longer than the voltage applying period $T_{AP}$, it is determined that an image having a proper contrast cannot be obtained, and the photographing operation is prohibited. Namely, a photographing operation, by which an image having a low contrast would be taken, is prevented, so that a wasteful recording operation is avoided.

Figure 9A:
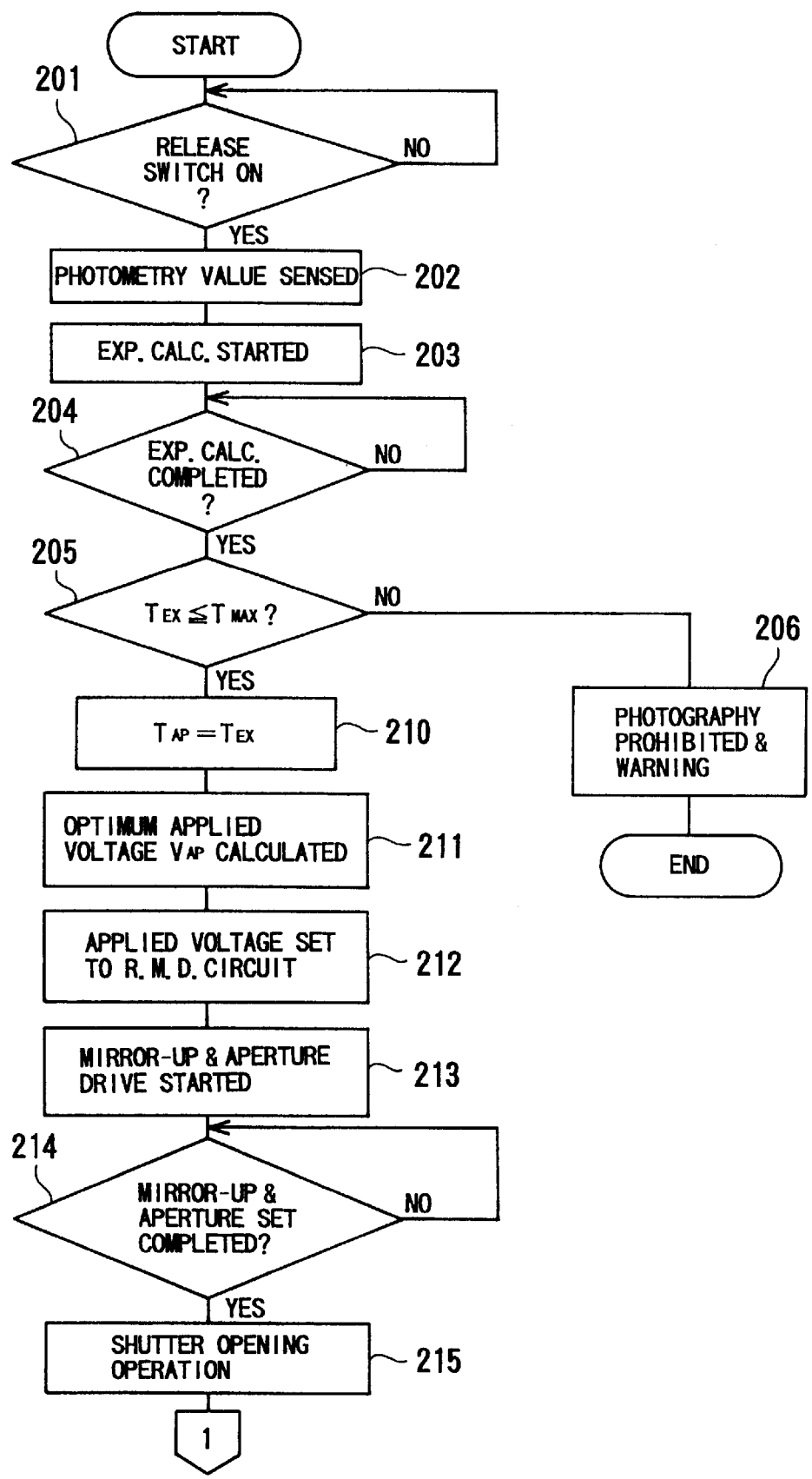
FIG. 9A is a first part of a flow chart of the photographing operation of a second embodiment of the present invention.
Figure 9B:
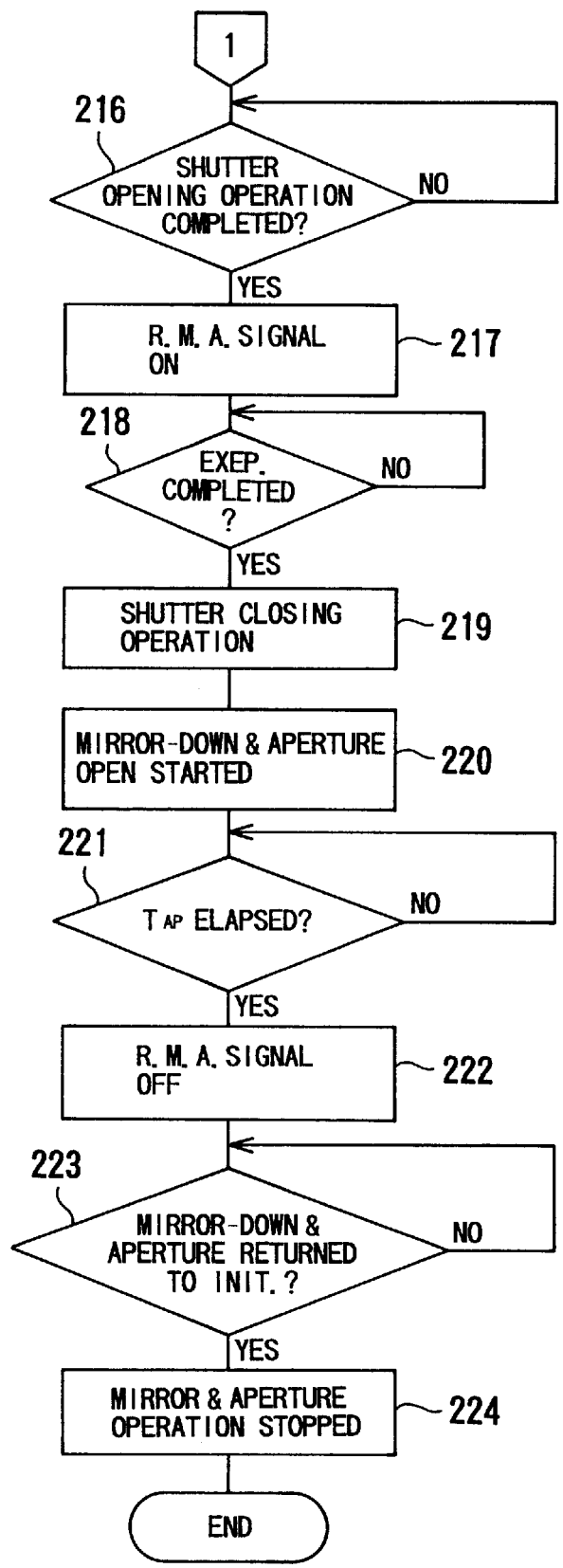
FIG. 9B is a second part of the flow chart shown in FIG. 9A.

FIGS. 9A and 9B show a flow chart of a second embodiment of the present invention. In the second embodiment, the voltage applying period $T_{AP}$ is not constant, and can be changed in accordance with the exposure period $T_{EX}$ obtained by the exposure calculation based on the photometry value of the object to be photographed. Note that the construction of the camera including the electric circuits is the same as shown in FIGS. 1 through 4.

The process in Steps 201 through 204 are the same as those of Steps 101 through 104 shown in FIG. 5A. In Step 205, it is determined whether the exposure period $T_{EX}$ obtained in Step 204 is shorter than or equal to the maximum period for which an electric voltage can be applied to the electro-developing recording medium 30, or the maximum period $T_{MAX}$ for which the recording medium activating signal can be outputted. The maximum period $T_{MAX}$ forr the voltage application is set based on the minimum value of the electric voltage which value is necessary for obtaining an optimum contrast of the image. This operation will be described below with reference to FIGS. 10 and 11.

Figure 10:
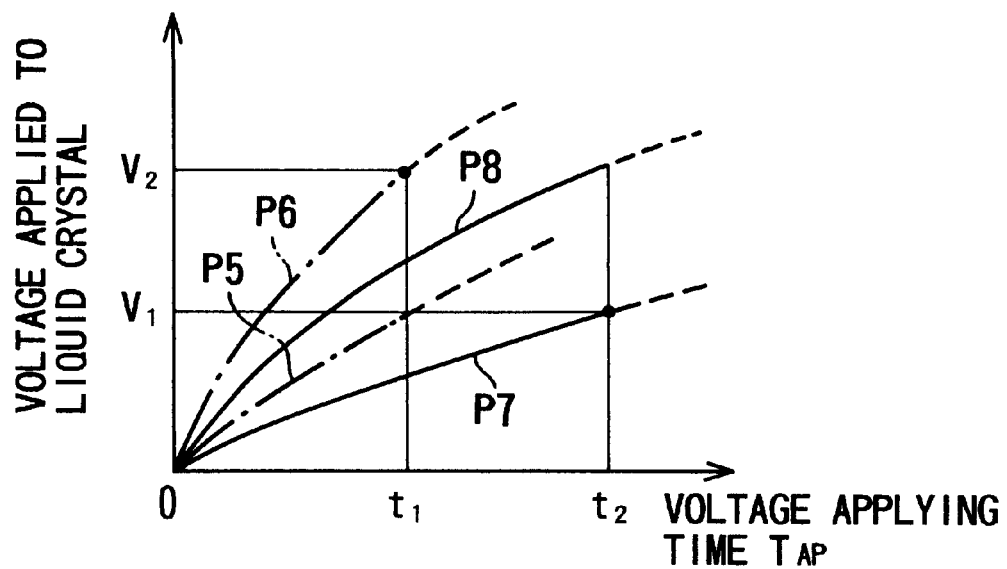
FIG. 10 is a view showing a relationship between a voltage applying period and a voltage generated in the liquid crystal of the electro-developing recording medium.

As shown in FIG. 10, it is supposed that, when a relatively high voltage is applied to the electro-developing recording medium 30, voltages are generated in a dark portion and a bright portion in the liquid crystal 40 as shown by references P5 and P6, and at time t1, the voltage difference (V2−V1) between the bright portion and the dark portion occurs, and thus, a predetermined contrast is obtained. If a relatively low voltage is applied to the electro-developing recording medium 30, a rise rate of the voltage in the liquid crystal 40 becomes small as shown by references P7 and P8. Therefore, for obtaining the same contrast as that obtained when the applied voltage is high, i.e., for obtaining the voltage difference (V2−V1), it takes time t2 which is longer than time t1.

Figure 11:
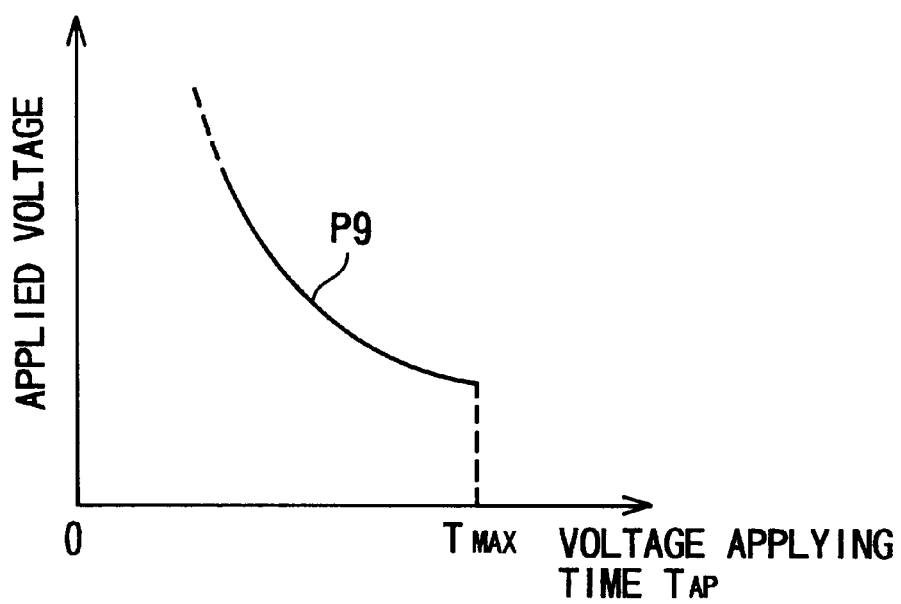
FIG. 11 is a view showing a relationship between a voltage applying period and an applied voltage which are necessary to obtain a predetermined contrast.

A relationship between the voltage applying time and the applied voltage, which are necessary to obtain the same contrast, is shown in FIG. 11. As shown by the solid line P9 in the drawing, the relationship between the voltage applying time and the applied voltage show s a hyperbola, and it is understood that the applied voltage should be reduced to prolong the voltage applying time. However, if the applying voltage is set too low, a voltage of a dark portion does not reach a value which is necessary to actuate the liquid crystal 40. Therefore, the applied voltage cannot be lowered infinitely, and there exists the maximum time $T_{MAX}$ of the voltage application.

With reference to FIG. 9A, when it is determined in Step 205 that the exposure period $T_{EX}$ is longer than the maximum period $T_{MAX}$, it is determined that the exposure of the electro-developing recording medium 30 cannot be carried out, since an image having a proper contrast cannot be obtained. Then, Step 206 is executed, in which a process for prohibiting the photographing operation is performed, and a warning meaning that the photographing is impossible is indicated on the display device 68, and then the program ends.

Conversely, when it is determined in Step 205 that the exposure period $T_{EX}$ is shorter than or equal to the maximum period $T_{MAX}$, Step 210 and the following Steps are executed so that a photographing operation is carried out. In Step 210, the exposure period $T_{EX}$ is set as the voltage applying period $T_{AP}$. In other words, the output period $T_{AP}$ of the recording medium activating signal is set to have the same value as a period for which the shutter 22 is open. In Step 211, an optimum applied voltage $V_{AP}$ is calculated and obtained based on the voltage applying period $T_{AP}$. This calculation is performed in such a manner that, for example, with reference to a table showing a relationship between the voltage applying period and the applied voltage (see FIG. 11), the applied voltage $V_{AP}$ corresponding to the voltage applying period $T_{AP}$ is read from the table.

In Step 212, a signal corresponding to the applied voltage $V_{AP}$ obtained in Step 211 is outputted to the recording medium drive circuit 41 (see FIG. 2), in which a control under which the voltage $V_{AP}$ is applied to the electro-developing recording medium 30 is performed, as described later.

The contents of the process in Steps 213 through 224 are the same as those of Steps 110 through 121 shown in FIGS. 5A and 5B.

Figure 12:
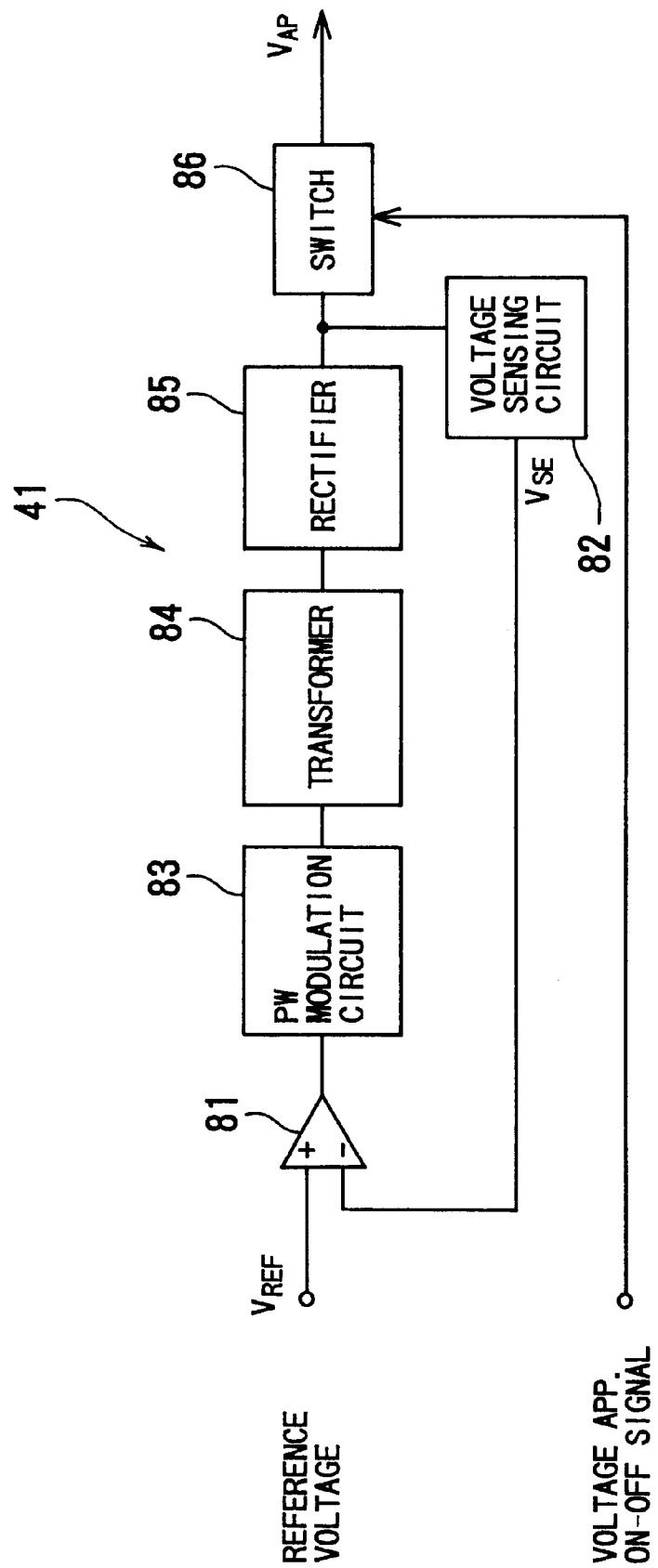
FIG. 12 is a block diagram showing a recording medium drive circuit in a second embodiment.

With reference to FIG. 12, a construction of the recording medium drive circuit 41 in the second embodiment is described.

A reference voltage $V_{REF}$ corresponding to the applied voltage $V_{AP}$ is inputted into a non inverting input of an amplifier 81 from the system control circuit 20. A voltage $V_{SE}$ sensed by a voltage sensing circuit 82 is inputted into an inverting input of the amplifier 81. A voltage signal corresponding to the difference between the reference voltage $V_{REF}$ and the applied voltage $V_{AP}$ is outputted from the amplifier 81 to a pulse width modulation circuit 83, in which a pulse signal having a width corresponding to the output voltage signal of the amplifier 81 is generated. The voltage of the pulse signal is raised in a step-up circuit (transformer) 84, so that the pulse signal is converted to a pulse signal having a predetermined amplitude. The latter pulse signal is rectified by a rectifier 85, so that a voltage to be applied to the electro-developing recording medium 30 is generated. This voltage is sensed by the voltage sensing circuit 82, so that the voltage is fedback to the amplifier 81. Thus, the applied voltage $V_{AP}$ corresponding to the reference voltage $V_{REF}$ is generated.

A switch 86 is controlled to be turned ON or OFF in accordance with a voltage application ON-OFF signal inputted from the system control circuit 20. Namely, the switch 86 is set to an ON-state in Step 217 shown in FIG. 9B, and set to an OFF-state in Step 222 shown in FIG. 9B.

As described above, according to the second embodiment, the same effect as that of the first embodiment is obtained.

Figure 13A:
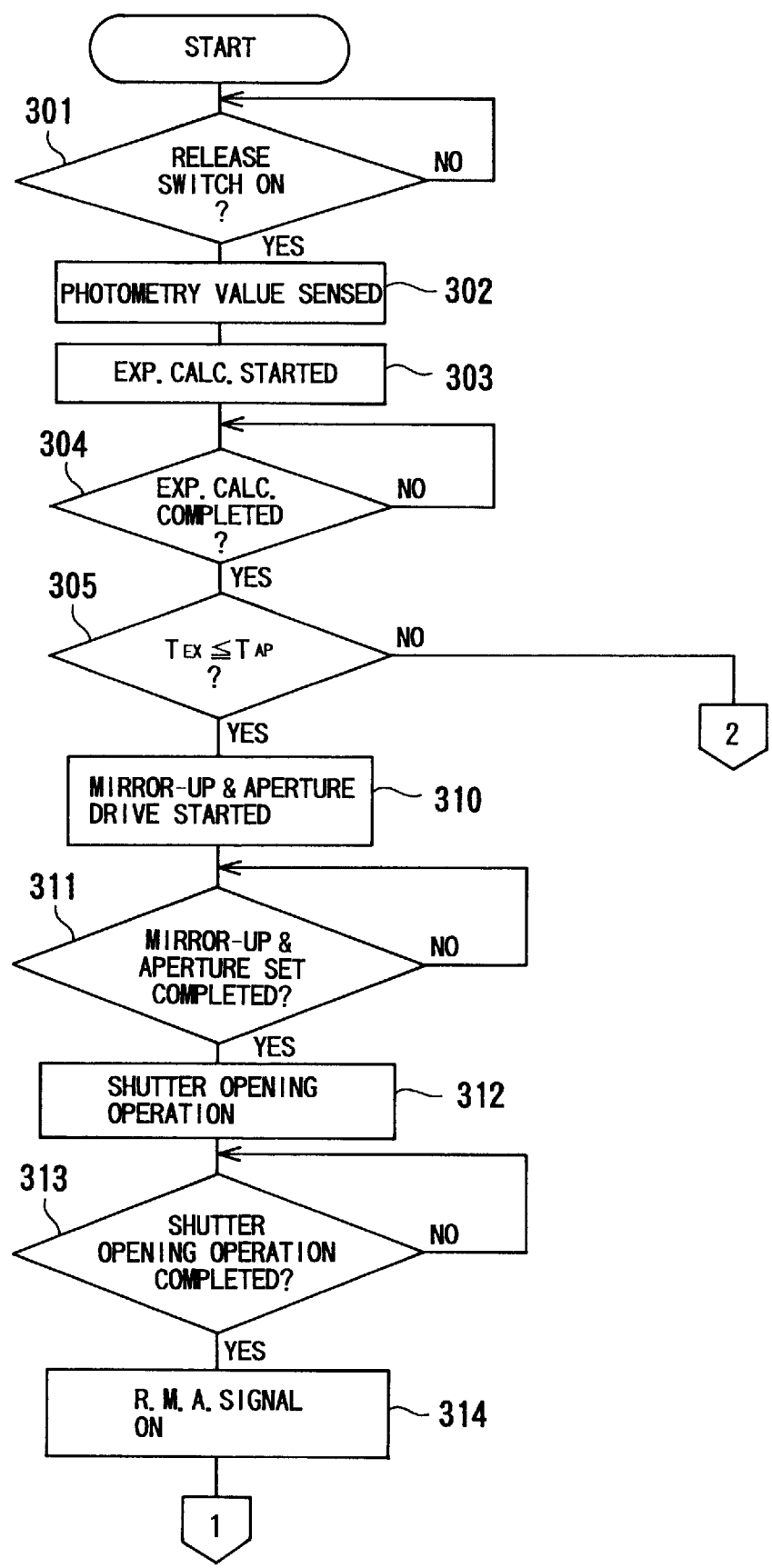
FIG. 13A is a first part of a flow chart of a photographing operation of a third embodiment of the present invention.
Figure 13B:
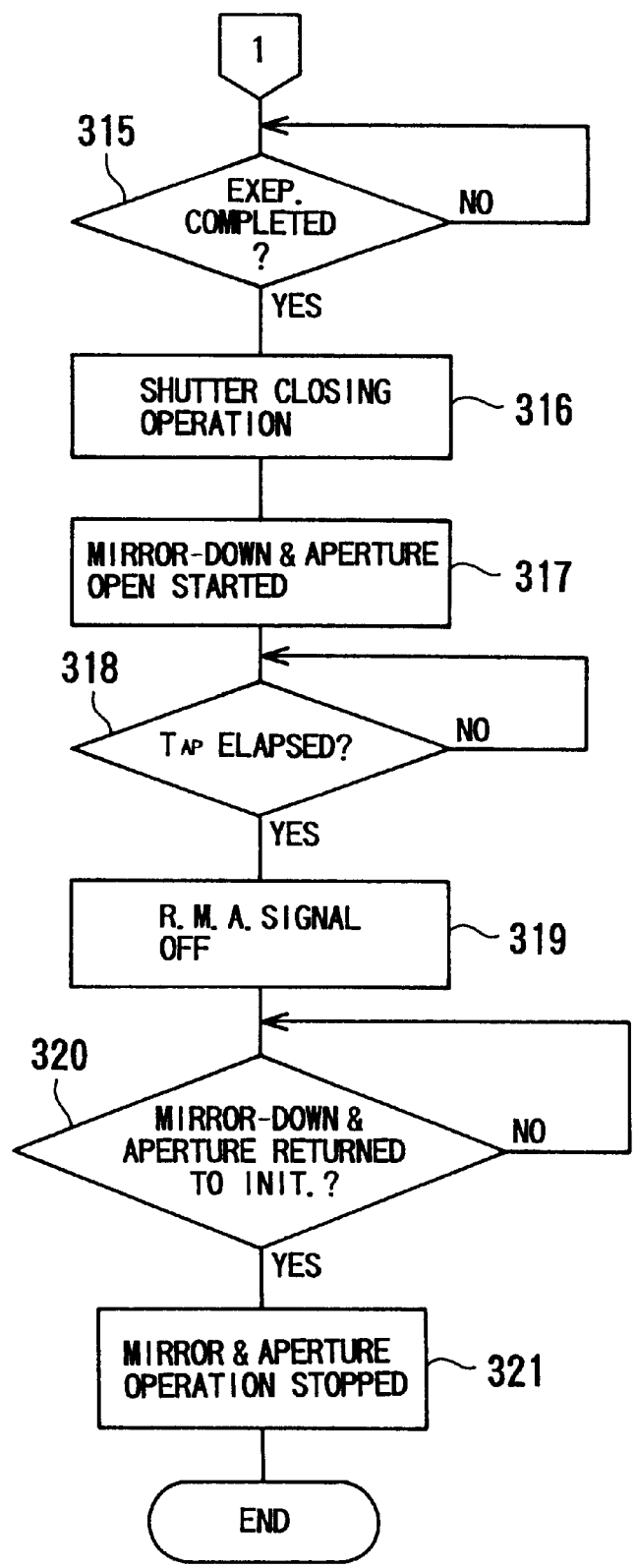
FIG. 13B is a second part of the flow chart of the third embodiment.
Figure 13C:
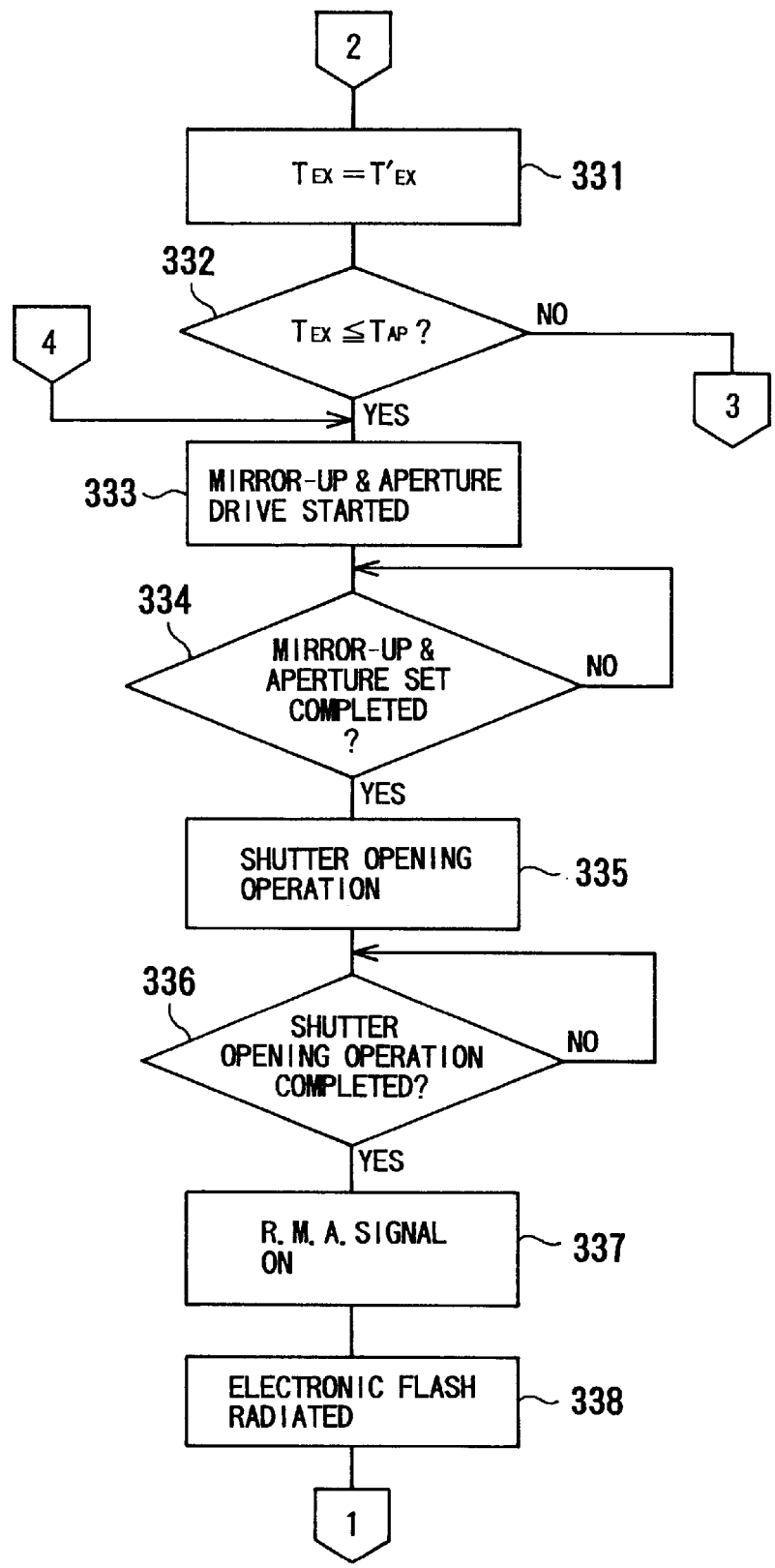
FIG. 13C is a third part of the flow chart of the third embodiment.
Figure 13D:
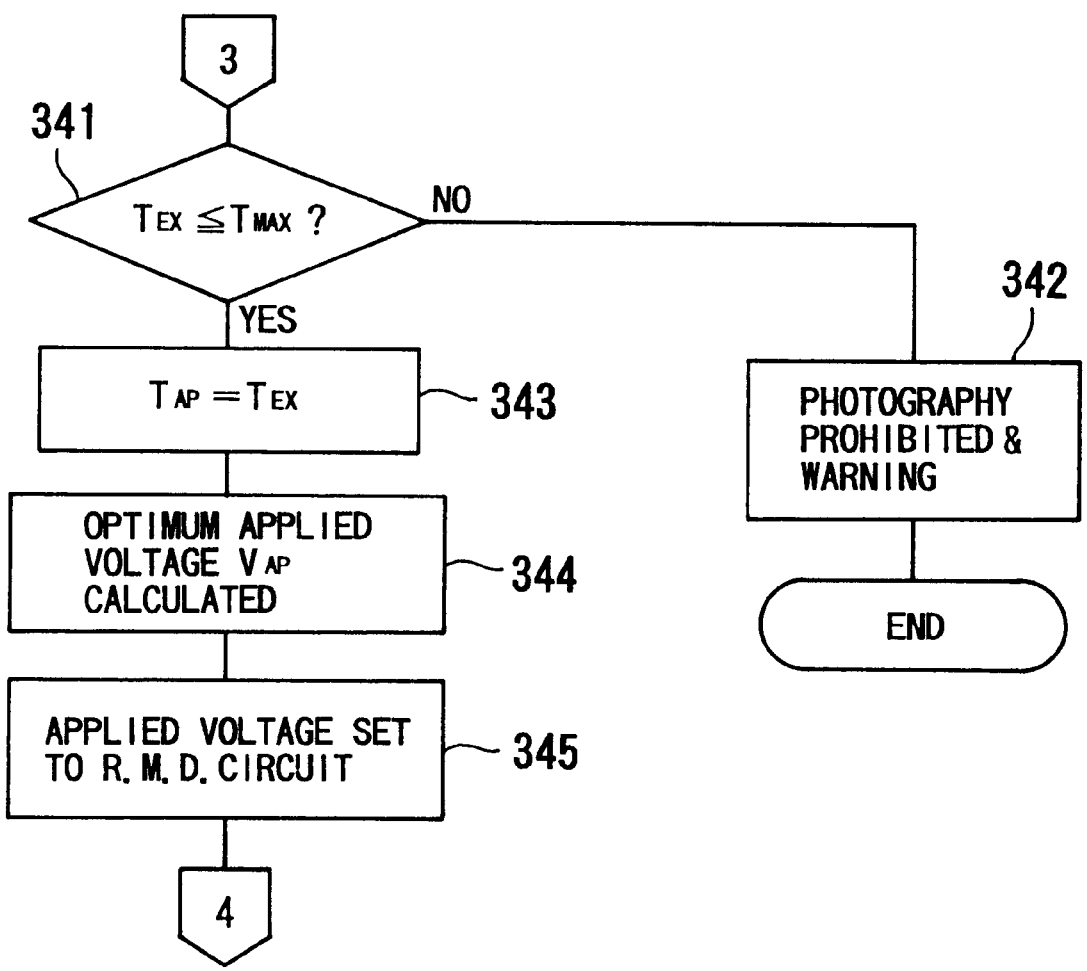
FIG. 13D is a fourth part of the flow chart of the third embodiment.
Figure 14:
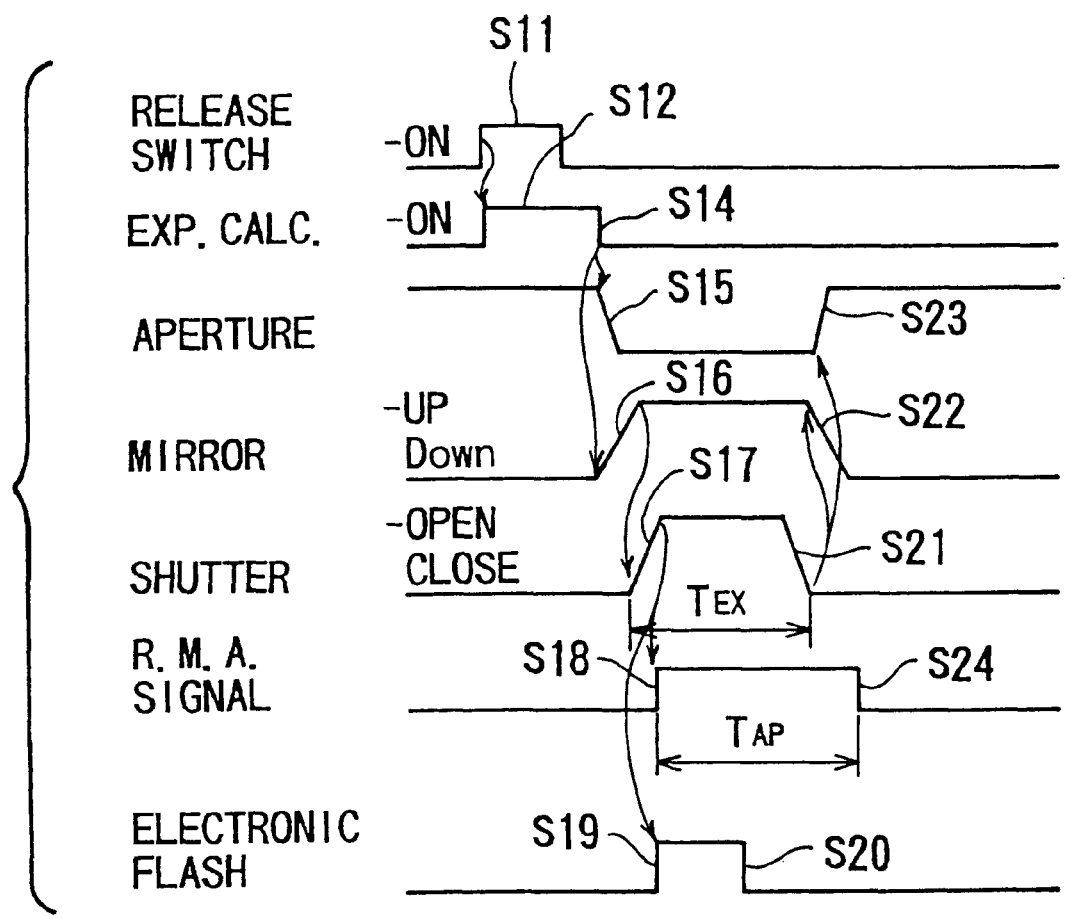
FIG. 14 is a timing chart showing the photographing operation of the third embodiment.

FIGS. 13A through 13D show a flow chart of a third embodiment of the present invention, and FIG. 14 is a timing chart of the third embodiment. In FIG. 14, the same references as those of FIG. 6 are the same operations. The construction of the camera, including the electric circuit of the third embodiment, are the same as that of the first embodiment shown in FIGS. 1 through 4. With reference to these drawings, the third embodiment will be described below.

Operations in Steps 301 through 304 are basically the same as those in Steps 101 through 104 shown in FIG. 5A, and a first set exposure period $T_{EX}$ is obtained in Step 304. In Step 305, it is determined whether the first set exposure period $T_{EX}$ obtained in Step 104 is longer than an output period (a voltage applying period $T_{AP}$) for which the recording medium activating signal is to be outputted.

When, in Step 305, it is determined that the first set exposure period $T_{EX}$ is shorter than or equal to the voltage applying period $T_{AP}$ (i.e., the reference value), Steps 310 through 321 are executed so that a photographing operation is carried out without radiating the electronic flash 13. Operations in Steps 310 through 321 are the same as those in Steps 110 through 121.

Conversely, when it is determined in Step 305 that the first set exposure period $T_{EX}$ is longer than the voltage applying period $T_{AP}$, Step 331 and the following Steps are executed. Namely, a photographing operation is carried out with radiating the electronic flash 13 so that the exposure period in the actual photographing operation is shortened in comparison with the first set exposure period $T_{EX}$.

In Step 331, an exposure period $T'_{EX}$ (1/60 second, for example) when using the electronic flash 13, i.e., the strobe synchronization speed, is set to a second set exposure period $T_{EX}$. This exposure period $T'_{EX}$ is the maximum period for which the electronic flash 13 can be radiated. Namely, the second set exposure period $T_{EX}$ is shorter than the actual radiating period of the electronic flash 13. In Step 332, it is determined whether the second set exposure period $T_{EX}$ is longer than the voltage applying period $T_{AP}$. When the second set exposure period $T_{EX}$ is shorter than or equal to the voltage applying period $T_{AP}$, Steps 333 through 338 are executed so that a photographing operation is carried out with radiating the electronic flash 13.

Operations in Steps 333 through 337 are the same as those in Steps 310 through 314. After the recording medium activating signal is outputted in Step 337, the electronic flash 13 is radiated in Step 338. Namely, the radiation of the electronic flash 13 is started (reference S19), and then, when the amount of light sensed by the reflected light sensor 72 reaches a predetermined value, the radiation of the electronic flash 13 is stopped (reference S20). Steps 337 and 338 are executed substantially at the same time. Namely, the output of the recording medium activating signal and the radiation of the electronic flash 13 are started at the same time. During this control of the electronic flash 13, Step 315 is executed, in which it is determined whether the second set exposure period $T_{EX}$ has elapsed, i.e., whether the exposure has been completed. When the exposure has been completed, Steps 316 through 321 are executed, and thus, the end process of the photographing operation as described above is carried out.

Thus, when the first exposure period $T_{EX}$ obtained by the exposure calculation is longer than the output period (the voltage applying period $T_{AP}$) for which the recording medium activating signal is outputted, the actual exposure period is controlled to be shorter than the voltage applying period $T_{AP}$, by radiating the electronic flash 13. Therefore, an image is recorded on the electro-developing recording medium 30 under a good condition so that a desired image can be obtained.

On the other hand, when it is determined in Step 332 that the second set exposure period $T_{EX}$ is longer than the voltage applying period $T_{AP}$, Step 341 is executed so that the photographing operation is performed with an exposure period shorter than the second exposure period $T_{EX}$. In Step 341, it is determined whether the second exposure period $T_{EX}$ obtained in Step 331 is shorter than or equal to the maximum period for which an electric voltage can be applied to the electro-developing recording medium 30, i.e., the maximum period $T_{MAX}$ for which the recording medium activating signal can be outputted. The maximum period $T_{MAX}$ of the voltage application is set based on the minimum value of the applied voltage necessary to obtain an optimum contrast, as described above with reference to FIGS. 10 and 11.

When it is determined in Step 341 that the exposure period $T_{EX}$ is shorter than or equal to the maximum period $T_{MAX}$, Steps 343 through 345 are executed so that a photographing operation is performed. In Step 343, the second exposure period $T_{EX}$ is set as the voltage applying period $T_{AP}$. In other words, the output period $T_{AP}$ of the recording medium activating signal is set so as to be equal to the period while the shutter 22 is open. In Step 344, the optimum applied voltage $V_{AP}$ is calculated and obtained based on the voltage applying period $T_{AP}$. This calculation is carried out in such a manner that, with reference to a table showing a relationship between the voltage applying period and the applied voltage (see FIG. 11), for example, the applied voltage $V_{AP}$ corresponding to the voltage applying period $T_{AP}$ is read from the table.

In Step 345, a signal corresponding to the applied voltage $V_{AP}$ obtained in Step 344 is outputted to the recording medium drive circuit 41 (see FIG. 2), in which a control under which the voltage $V_{AP}$ is applied to the electro-developing recording medium 30 is performed. Then, Steps 333 through 338 are executed, so that a photographing operation is carried out using the electronic flash 13.

Thus, when the exposure period $T'_{EX}$, for which the electronic flash is radiated, (i.e., the strobe synchronization speed or the second set exposure period $T_{EX}$) is longer than the voltage applying period $T_{AP}$, the second set exposure period $T_{EX}$ is set as the voltage applying period $T_{AP}$ if the second set exposure period $T_{EX}$ is shorter than or equal to the maximum period $T_{MAX}$. Then, the electro-developing recording medium 30 is controlled by using the applied voltage $V_{AP}$ obtained based on the voltage applying period $T_{AP}$, and the electronic flash 13 is radiated to carry out the photography. Therefore, even in such a case, an image can be recorded in the electro-developing recording medium 30 under a proper condition, and thus a desired image can be obtained.

On the other hand, when it is determined in Step 341 that the second set exposure period $T_{EX}$ is longer than the maximum period $T_{MAX}$, it is determined that the exposure of the electro-developing recording medium 30 cannot be carried out, since an image having a proper contrast cannot be obtained. Then, Step 342 is executed, in which a process for prohibiting the photographing operation is performed, and a warning meaning that the photographing is impossible is indicated on the display device 68, and then the program ends.

As described above, according to the third embodiment, even if the set exposure period is shorter than a predetermined period due to a dark object to be photographed, the exposure period is shortened by radiating the electronic flash 13, so that a proper image can be obtained.

Figure 15:
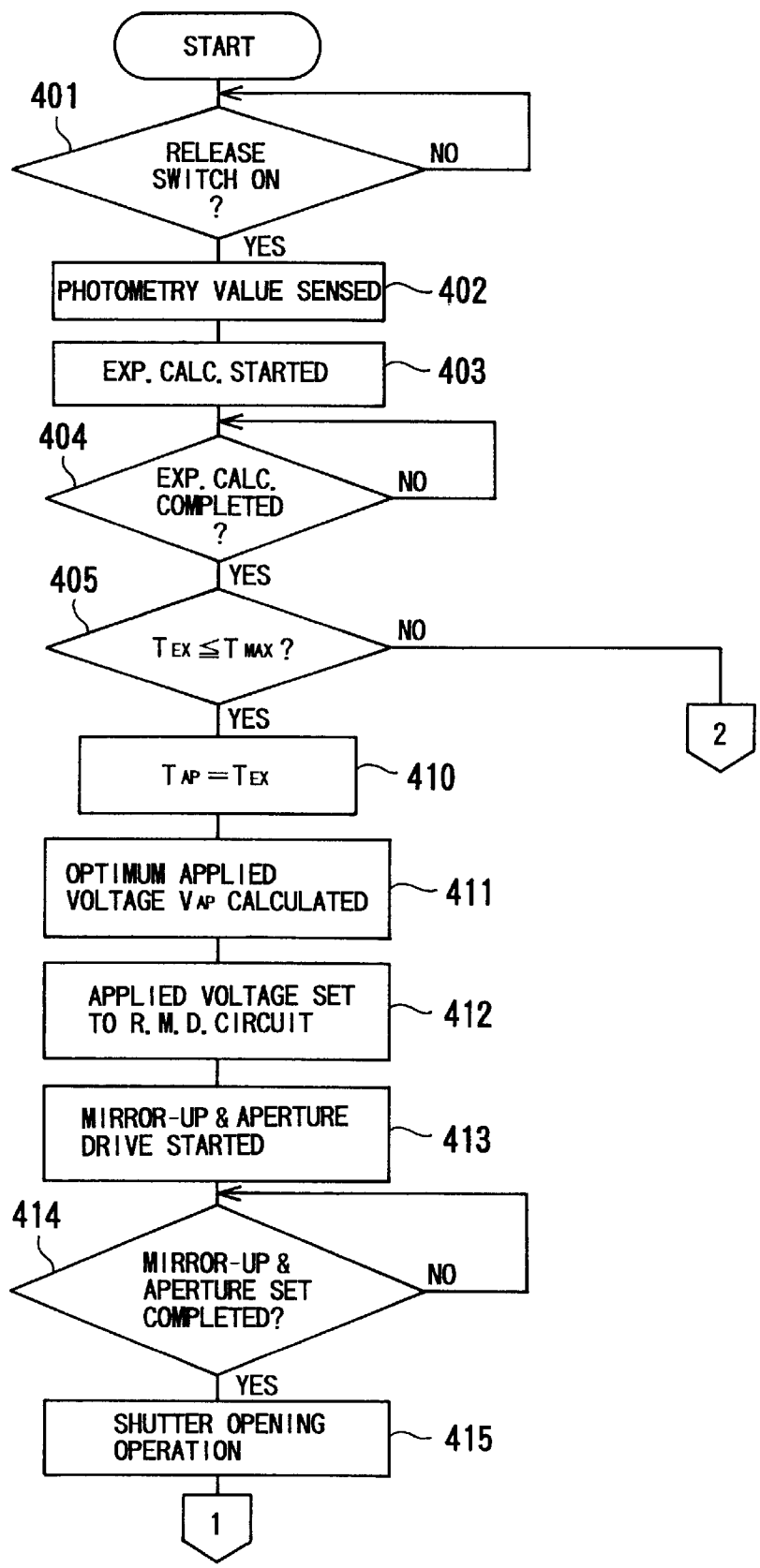
FIG. 15 is a part of a flow chart of a photographing operation of a fourth embodiment of the present invention.

FIG. 15 is a part of a flow chart of a photographing operation in a fourth embodiment of the present invention. The construction of the camera including the electric circuit of the fourth embodiment is the same as that of the first embodiment shown in FIGS. 1 through 4.

The operation of Steps 401 through 404 are the same as those in Steps 101 through 104 shown in FIG. 5A. In Step 405, similarly to Step 341, it is determined whether the first set exposure period $T_{EX}$ obtained in Step 404 is shorter than or equal to the maximum period $T_{MAX}$ for which an electric voltage can be applied to the electro-developing recording medium 30. When the first set exposure period $T_{EX}$ is shorter than or equal to the maximum period $T_{MAX}$, Step 410 and the following Steps are executed so that a photographing operation is performed without radiating the electronic flash 13.

The operations in Steps 410 through 412 are the same as those in Steps 343 through 345 shown in FIG. 13D, and the operations in Steps 413 through 415 are the same as those in Steps 310 through 312. After the execution of Step 415, the operations shown in Steps 315 through 321 of FIG. 13B are carried out.

Conversely, when it is determined in Step 405 that the first set exposure period $T_{EX}$ is longer than the maximum period $T_{MAX}$, operations shown in Steps 331 through 338 of FIG. 13C and Steps 341 through 345 of FIG. 13D are carried out.

As described above, in the fourth embodiment, it is determined in Step 405 whether the first set exposure period $T_{EX}$ is shorter than or equal to the maximum period $T_{MAX}$, and when the first set exposure period $T_{EX}$ is shorter than or equal to the maximum period $T_{MAX}$, after the executions of Steps 410 through 412, Steps 413 and the following Steps are executed so that a photographing operation is carried out. Except for such operations, the other operations are the same as those of the third embodiment shown in FIGS. 13A through 13D. Therefore, according to the fourth embodiment, the same effect as that of the third embodiment can be obtained.

Figure 16A:
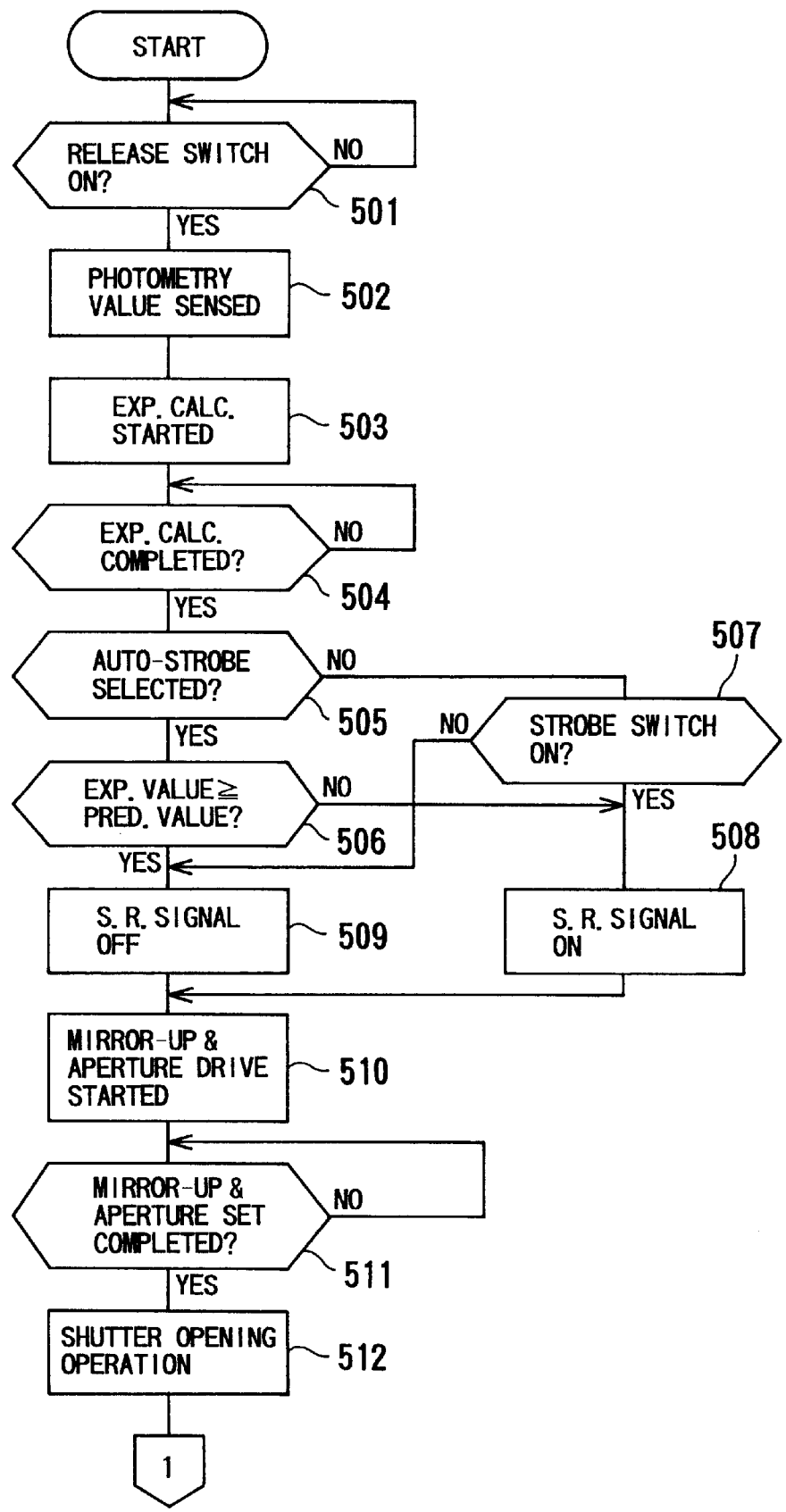
FIG. 16A is a first part of a flow chart of a photographing operation of a fifth embodiment of the present invention.
Figure 17:
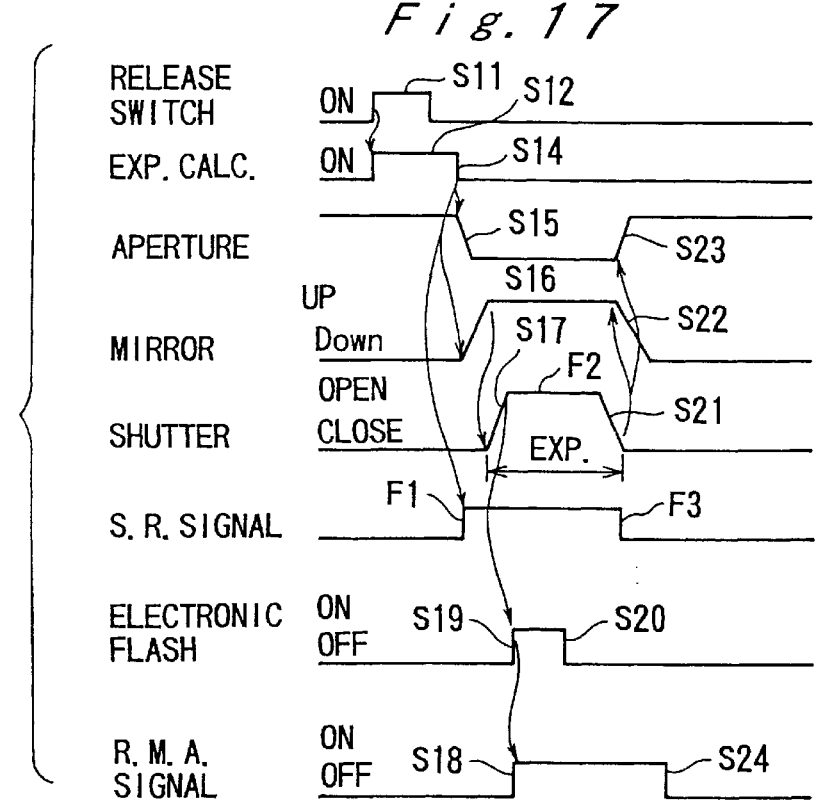
FIG. 17 is a timing chart showing a first condition of the photographing operation of the fifth embodiment.
Figure 18:
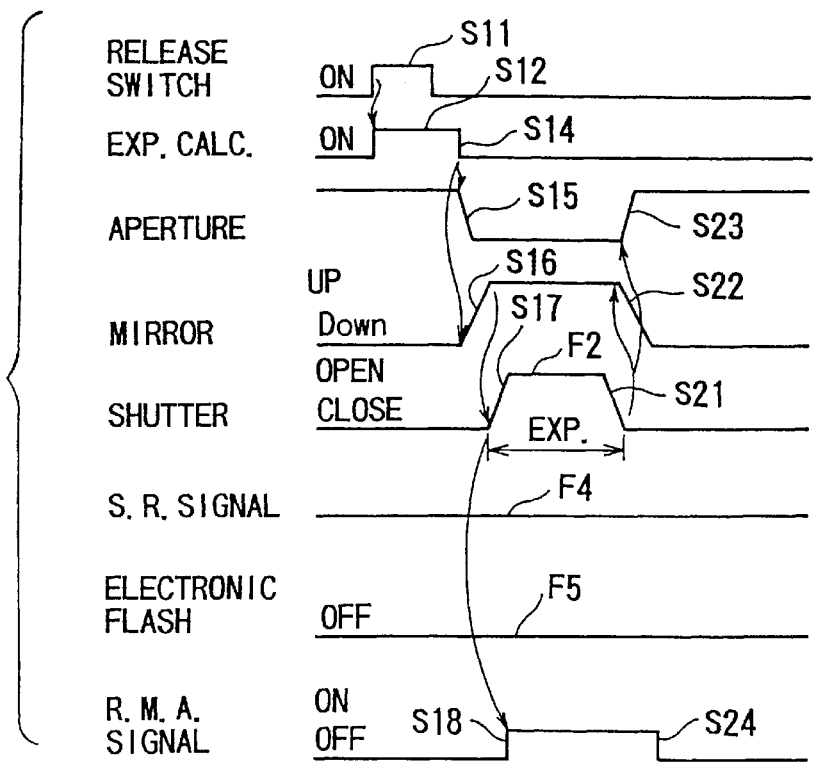
FIG. 18 is a timing chart showing a second condition of the photographing operation of the fifth embodiment.
Figure 16B:
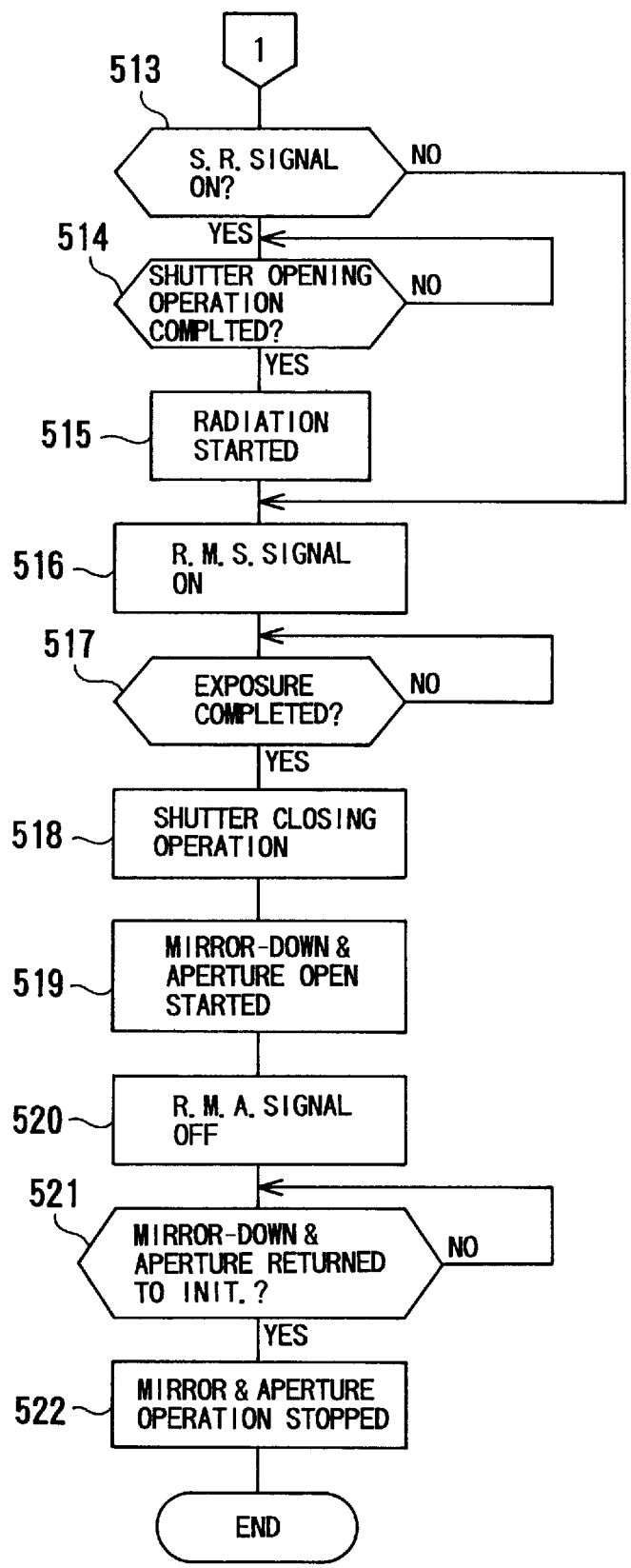
FIG. 16B is a second part of the flow chart of the fifth embodiment.
Figure 19:
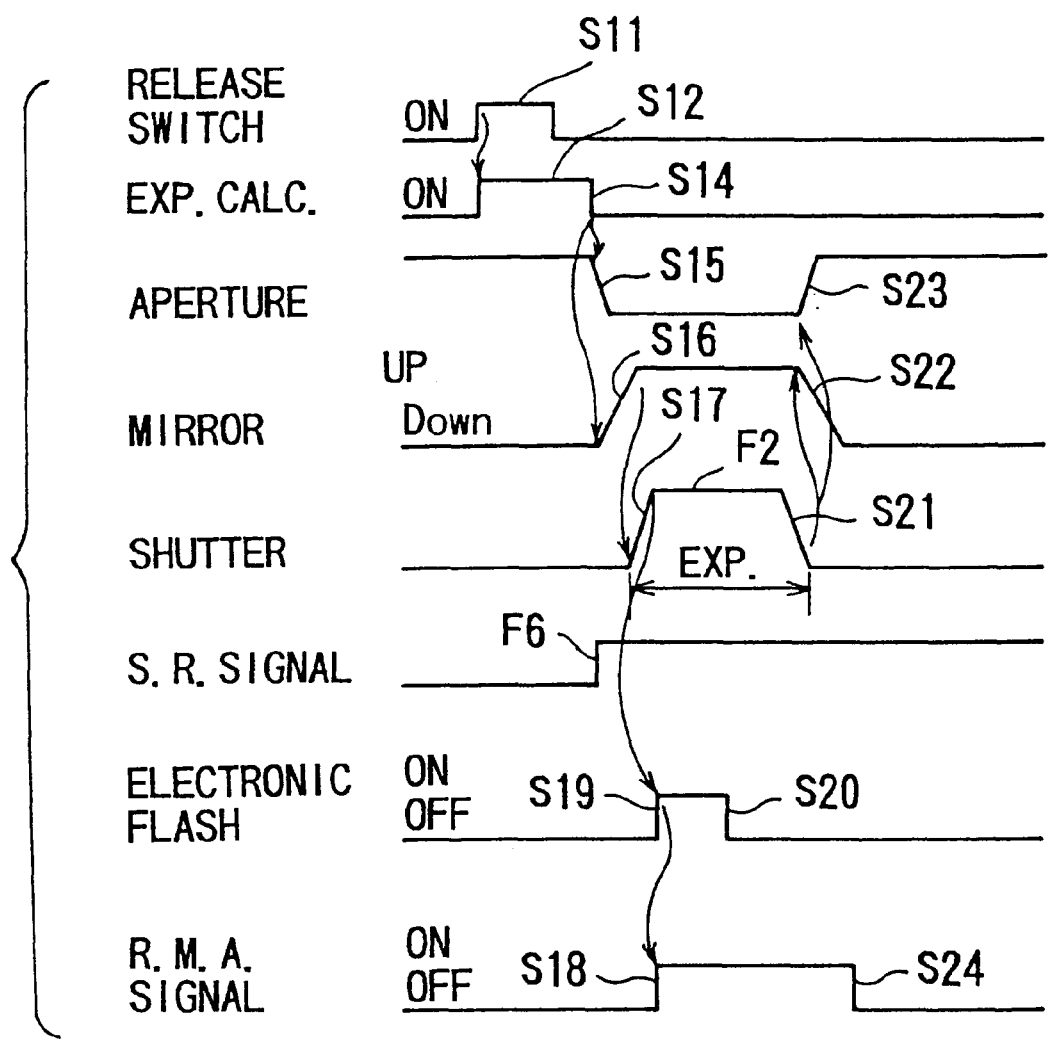
FIG. 19 is a timing chart showing a third condition of the photographing operation of the fifth embodiment.

FIGS. 16A and 16B show a flow chart of a photographing operation in a fifth embodiment of the present invention, and FIGS. 17 through 19 show timing charts of the fifth embodiment. The construction of the camera including the electric circuit of the fifth embodiment is the same as that of the first embodiment shown in FIGS. 1 through 4.

A first condition shown in FIG. 17 is described below. In the first condition, the auto-strobe switch 73 is set so that the auto-strobe mode is selected, and the electronic flash 13 should be radiated since the object to be photographed is dark. Note that the auto-strobe mode is a mode in which the radiation of the electronic flash 13 is determined in accordance with the exposure result.

When it is sensed in Step 501 that the release switch 14 has been depressed (reference S11), an output signal of the photometry sensor 28, i.e., a photometry value is sensed in Step 502. In Step 503, an exposure calculation is started based on the photometry value (reference S12). When it is determined in Step 504 that the exposure calculation has been completed (reference S14), it is determined in Step 505 whether the auto-strobe switch 73 has been set so that the auto-strobe mode is selected. Since it is supposed that the auto-strobe mode has been set, Step 506 is executed, so that it is determined whether the exposure value, which is the result of the exposure calculation, is larger than a predetermined value. In this example, the exposure value is less than the predetermined value, and thus, it is determined that the electronic flash 13 should be radiated. Therefore, in Step 508, a signal indicating that it is necessary to radiate the electronic flash 13 is outputted (reference F1), the signal being referred to as a strobe radiation signal, hereinafter.

In Step 510, the opening degree of the aperture 12a is changed from the fully open state to a predetermined opening degree (reference S15), and the quick return mirror 21 is changed from the down condition to the up-condition (reference S16). When it is confirmed in Step 511 that the quick return mirror 21 has been changed to the up-condition and the opening degree adjustment of the aperture 12a has been completed, the shutter is started to open in Step 512 (reference S17). In this embodiment, the shutter 22 is a focal-plane shutter, and therefore, a magnet for performing a shutter charge is deenergized in Step 512.

In Step 513, it is determined whether the strobe radiation signal is outputted. In the example shown in FIG. 17, the strobe radiation signal is outputted in Step 508. Therefore, the process goes from Step 513 to Step 514, in which it is determined whether an opening operation of the shutter 22 has been completed. This determination is carried out by measuring a time since the magnet is deenergized, i.e., the time after the opening operation of the shutter 22 is started in Step 512. When the shutter 22 is fully opened (reference F2), the radiation of the electronic flash 13 is started (reference S19) in Step 515, and the recording medium activating signal is outputted (reference S18) in Step 516. Namely, the radiation of the electronic flash 13 and the output of the recording medium activating signal are performed at the same time, and are performed in association with the opening operation of the shutter 22. Due to the output of the recording medium activating signal, a predetermined electric voltage is applied to the electro-developing recording medium 30. By exposing the electro-developing recording medium 30 under this condition, the object image is developed on the electro-developing recording medium 30 as a visible image, which is kept on the electro-developing recording medium 30 even after the output of the recording medium activating signal is stopped.

When, in Step 517, the exposure period $T_{EX}$ determined by the exposure calculation has passed and it is sensed that the exposure has been completed, the shutter 22 is closed in Step 518 (reference S21). By the completion of the closing operation of the shutter 22, Step 519 is executed so that the quick return mirror 21 is changed to the down-condition (reference S22) and the aperture 12a is driven to the fully open condition (reference S23). Note that, during this exposure period, when the amount of light sensed by the reflected light sensor 72 reaches a predetermined value, the radiation of the electronic flash 13 is stopped (reference S20). On completion of the exposure period, the output of the strobe radiation signal is stopped (reference F3).

In Step 520, the output of the recording medium activating signal is stopped (reference S24). Then, when it is confirmed in Step 521 that the mirror 21 and the aperture 12a have been returned to the initial conditions, respectively, the operations of the mirror 21 and the aperture 12a are stopped in Step 522, and thus, this photographing operation program ends.

With reference to FIGS. 16A, 16B and 18, a second condition of the fifth embodiment is described. In the second condition, the auto-strobe selection switch 73 is switched so that the auto-strobe mode is selected, and the electronic flash 13 need not be radiated, since the object to be photographed is bright. Note that the control steps other than that for radiating the electronic flash 13 are the same as those shown in FIG. 17.

The operations of steps 501 through 505 were described above. In Step 506, it is determined that the exposure value is larger than or equal to a predetermined value. Therefore, Step 509 is executed so that the strobe radiation signal is not outputted (reference F4). Then, after the executions of Steps 510 through 512, it is determined in Step 513 that the radiation of the electronic flash 13 is not needed. Therefore, Steps 514 and 515 are skipped, so that the electronic flash 13 is not radiated, and in Step 516, the recording medium activating signal is outputted. Namely, in the second condition, the recording medium activating signal is outputted at the same time as the opening operation of the shutter 22. The other operations are the same as those of the first condition shown in FIG. 17, and the detailed explanation thereof is omitted.

A third condition of the fifth embodiment is described with reference to FIGS. 16A, 16B and 19. In the third condition, the auto-strobe selection switch 73 is switched so that the auto-strobe mode is not selected, that is, the radiation of the electronic flash 13 is manually set.

When the electronic flash 13 is compulsorily radiated in spite of the object's brightness, the strobe switch 74 is set by the user to the ON-state. Thus, the process goes from Step 505 to Step 507, and it is determined that the strobe switch 74 has been set to the ON-state. Namely, Step 508 is executed, so that the strobe radiation signal is outputted (reference F6). Therefore, it is determined in Step 513 that the strobe radiation signal is outputted, and similarly to the first condition shown in FIG. 17, Step 514 and the following Steps are executed so that the radiation of the electronic flash 13 is performed.

When the electronic flash 13 is not radiated and the object is dark nevertheless, the strobe switch 74 is set by the user to the OFF-state. Therefore, since it is determined in Step 507 that the strobe switch 74 has been set to the OFF-state, Step 509 is executed, and thus, the strobe radiation signal is not outputted (reference F4) as shown in FIG. 18. Therefore, the process goes from Step 513 to Step 516, so that the electronic flash 13 is not radiated (reference F5). Then, Steps 517 through 522 are executed.

As described above, in the fifth embodiment, when the electronic flash 13 is radiated, the recording medium activating signal is outputted at the same time when the electronic flash 13 is radiated. Namely, an electric voltage is applied to the electro-developing recording medium 30 at the same time when the electronic flash 13 is radiated. Therefore, the voltage is not applied to the electro-developing recording medium 30 before the developing operation of the electro-developing recording medium 30 is started, and thus, a wasted voltage application is prevented.

Further, in the fifth embodiment, the recording medium activating signal is outputted in association with the opening operation of the shutter 22. Namely, the voltage application to the electro-developing recording medium 30 is started at the same time when the exposure is started. An effect obtained by such an operation is described below with reference to FIGS. 7 and 20.

Figure 20:
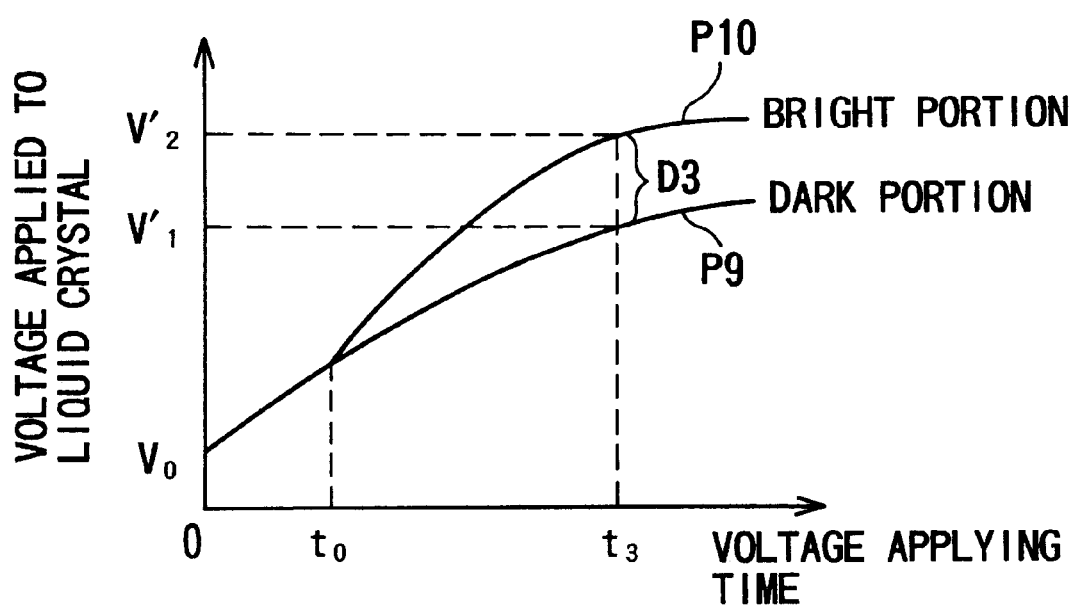
FIG. 20 is a view showing a relationship between a voltage applying period and a voltage generated in a liquid crystal of an electro-developing recording medium, when the exposure is started after the voltage application.

In the change of voltage generated in the liquid crystal 40 of the electro-developing recording medium 30, at the beginning, the voltage rises more quickly in a bright portion (reference P2) than in a dark portion (reference P1), and the difference D1 between the voltage V2 of the bright portion and the voltage V1 of the dark portion becomes a maximum at time t1. Conversely, if the exposure is started when time T0 has elapsed since the voltage application is started, as shown in FIG. 20, the ratio of the voltage rise of the dark portion (reference P9) to the voltage rise of the bright portion (reference P10) is not so large as the case of FIG. 7. Therefore, although the difference D3 between the voltage V2' of the bright portion and the voltage V1' of the dark portion becomes a maximum at time t3, the difference D3 is smaller than the difference D1 shown in FIG. 7. Namely, the contrast of the image is made a maximum when the start of the voltage application and the start of the exposure are carried out at the same time. Note that the length from time T0 to time t3 in FIG. 20 is approximately the same as the length from time 0 to time t1 in FIG. 7.

Thus, the voltage of the dark portion rises at a predetermined ratio from the starting of the voltage application, and the ratio of rise is approximately always constant as shown by references P1 and P9, since the amount of light in the dark portion is small. Conversely, the ratio of rise of the voltage in the bright portion is changed in accordance with time from the start of the exposure, and if the exposure is started at time t0, the voltage of the bright portion rises gradually from time t0. Therefore, if the start of the exposure is behind the start of the voltage application, the voltage difference in the bright and dark portions is small, so that the contrast of the image is low.

As described above, the fifth embodiment is constructed in such a manner that the output of the recording medium activating signal and the exposure are started at the same time, and the voltage application is stopped when the voltage difference D1 in the bright and dark portions becomes a maximum. Therefore, an image having a sufficiently high contrast can be obtained.

Note that the electro-developing recording medium 30 is not restricted to the construction described above, but can be any medium in which an image is developed electronically.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 7-56582, 7-56583 and 7-56584 (all filed on Feb. 21, 1995) which are expressly incorporated herein, by reference, in their entirety.

I claim:

1. A device for controlling a photographing operation of an electro-developing type camera, comprising:

an electronic flash;

an electro-developing recording medium that electronically develops an image which is formed by exposing said electro-developing recording medium;

a system that outputs a recording medium activating signal so that said electro-developing recording medium can develop said image;

a calculation system that performs an exposure calculation based on a photometry value, so that a first set exposure period, for which said electro-developing recording medium can be exposed to develop said image, is obtained; and a system that actuates said electronic flash to radiate light, when said first set exposure period is longer than a standard value, so that an actual exposure period, for which said electro-developing recording medium is actually exposed, becomes shorter than said first set exposure period;

said standard value comprising an output period for which said recording medium activating signal is output.

2. A control device according to claim 1, further comprising a system that sets a second set exposure period for which said electro-developing recording medium can be exposed and which is longer than a radiation period for which said electronic flash is radiated when said first set exposure period is longer than said standard period, said actuating system actuates said electronic flash when said second set exposure period is shorter than or equal to said standard value.

3. A control device according to claim 2, wherein said radiating means radiates said electronic flash, when said second set exposure period is shorter than a maximum period for which said recording medium activating signal can be outputted, even if said second set exposure period is longer than said standard value.

4. A control device according to claim 1, wherein said electro-developing recording medium comprises an electrostatic information recording medium that generates an electric charge in accordance with an image formed thereon, and an electric charge keeping medium which generates a visible image in accordance with said electric charge and which can keep said visible image.

5. A control device according to claim 4, wherein said electric charge keeping medium comprises a liquid crystal display having a memory-type liquid crystal.

6. A device for controlling a photographing operation of an electro-developing type camera, comprising:

an electronic flash;

an electro-developing recording medium that electronically develops an image which is formed by exposing said electro-developing recording medium;

a system that outputs a recording medium activating signal so that said electro-developing recording medium can develop said image;

a system that performs an exposure calculation based on a photometry value, so that a first set exposure period, for which said electro-developing recording medium can be exposed to develop said image, is obtained; and a system that actuates said electronic flash to radiate light, when said first set exposure period is longer than a standard value, so that an actual exposure period, for which said electro-developing recording medium is actually exposed, becomes shorter than said first set exposure period;

said electronic flash actuating system actuates said electronic flash to radiate light, when said standard value is shorter than a maximum period, for which said recording medium activating signal can be output.

7. A control device according to claim 6, further comprising a system that sets a second set exposure period for which said electro-developing recording medium can be exposed and which is longer than a radiation period for which said electronic flash is radiated when said first set exposure period is longer than said standard period, said actuating system actuates said electronic flash when said second set exposure period is shorter than said standard value.

8. A control device according to claim 7, wherein said actuating system actuates said electronic flash, when said second set exposure period is shorter than the maximum period, for which said recording medium activating signal can be output, even if said second set exposure period is longer than said standard value.

9. A device for controlling a photographing operation of an electro-developing type camera, said control device comprising:

an electro-developing recording medium that electronically develops an image which is formed by exposing said electro-developing recording medium;

an output system that outputs a recording medium activating signal so that said electro-developing recording medium can develop said image;

an electronic flash;

a system that determines whether or not said electronic flash should be radiated; and a system that controls said electronic flash to radiate light at a predetermined timing when said determining system determines that said electronic flash should radiate light;

said electronic flash being actuated to begin radiating light substantially at the same time as said recording medium activating signal is output to begin developing the image.

10. A control device according to claim 9, further comprising a shutter that opens and closes an optical path passing through said electro-developing recording medium, said radiation of said electronic flash and said output of said recording medium activating signal being carried out in association with an opening operation of said shutter.

11. A control device according to claim 10, wherein said radiation of said electronic flash and said output of said recording medium activating signal are carried out after said shutter has fully opened.

12. A control device according to claim 10, wherein said recording medium activating signal output system outputs said recording medium activating signal at the same time when said shutter begins to open, when said electronic flash does not have to be radiated.

13. A control device according to claim 9, wherein said electro-developing recording medium comprises an electrostatic information recording medium generating an electric charge in accordance with an image formed thereon, and an electric charge keeping medium which generates a visible image in accordance with said electric charge and which can keep said visible image.

14. A control device according to claim 9, wherein said electric charge keeping medium comprises a liquid crystal display having a memory-type liquid crystal.

15. The device for controlling a photographing operation of an electro-developing type camera according to claim 9, light from said electronic flash being radiated at a same time when said recording mmdeum activation signal is output.

* * * * *